(12) United States Patent
Liu et al.

(10) Patent No.: US 12,642,390 B2
(45) Date of Patent: Jun. 2, 2026

(54) FOOD PROCESSING MACHINE AND MOTOR

(71) Applicant: GUANGDONG MIDEA CONSUMER ELECTRIC MANUFACTURING CO., LTD., Foshan (CN)

(72) Inventors: Jinquan Liu, Foshan (CN); Xiantang Liang, Foshan (CN); Jiahao Liu, Foshan (CN); Xueyuan Zhu, Foshan (CN); Huishan Huang, Foshan (CN)

(73) Assignee: GUANGDONG MIDEA CONSUMER ELECTRIC MANUFACTURING CO., LTD., Foshan (CN)

( * ) Notice: Subject to any disclaimer, the term of this patent is extended or adjusted under 35 U.S.C. 154(b) by 311 days.

(21) Appl. No.: 18/636,167

(22) Filed: Apr. 15, 2024

(65) Prior Publication Data

US 2025/0169651 A1 May 29, 2025

(30) Foreign Application Priority Data

Nov. 27, 2023 (CN) .......................... 202311593343.9

(51) Int. Cl.
A47J 43/046 (2006.01)
A47J 27/00 (2006.01)
(Continued)

(52) U.S. Cl.
CPC ......... A47J 43/0465 (2013.01); A47J 27/004 (2013.01); A47J 43/0722 (2013.01);
(Continued)

(58) Field of Classification Search
CPC .... A47J 43/0465; A47J 43/046; A47J 43/085; H02K 21/24; H02K 1/16; H02K 15/021; H02K 5/128; H02K 1/28; H02K 5/24
See application file for complete search history.

(56) References Cited

U.S. PATENT DOCUMENTS

2015/0190015 A1* 7/2015 Ven Der Woning ........................ A47J 43/0465
366/145
2018/0206678 A1* 7/2018 Tu ........................ B01F 33/4533
2023/0412017 A1* 12/2023 Schmidt ................. H02K 3/345

FOREIGN PATENT DOCUMENTS

WO WO-2020007079 A1 * 1/2020 ............ A47J 43/085

OTHER PUBLICATIONS

Translation of WO-2020007079.*

* cited by examiner

*Primary Examiner* — Bobby Yeonjin Kim
(74) *Attorney, Agent, or Firm* — K&L Gates LLP

(57) ABSTRACT

The present disclosure provides a food processing machine and a motor, and the food processing machine comprises: a base assembly; a cup body assembly, and the cup body assembly can be mounted on the base assembly, and the cup body assembly comprises a cutting tool component; a motor, and the motor comprises a stator component and a rotor component, the stator component is provided in the base assembly, the rotor component brings the cutting tool component to rotate, and the stator assembly can drive the rotor component to rotate, and, a magnetic force line between the stator component and the rotor component, along the direction of a rotating axis of the rotor component, points at an S-pole of the rotor component from an N-pole of the stator component and points at an S-pole of the stator component from an N-pole of the rotor component; a magnetic force line inside the stator component points at the N-pole of the stator component from the S-pole of the stator component along a circumferential direction of the stator component, and a magnetic force line inside the rotor component points at the N-pole of the rotor component from the S-pole of the (Continued)

100

Axial direction rotor component along a circumferential direction of the rotor component.

13 Claims, 5 Drawing Sheets

(51) Int. Cl.
  *A47J 43/07*          (2006.01)
  *A47J 43/08*          (2006.01)
  *H02K 1/28*          (2006.01)
  *H02K 5/24*          (2006.01)
  *H02K 21/24*          (2006.01)
(52) U.S. Cl.
  CPC .............. *A47J 43/085* (2013.01); *H02K 1/28* (2013.01); *H02K 5/24* (2013.01); *H02K 21/24* (2013.01)

A

FOOD PROCESSING MACHINE AND MOTOR

CROSS-REFERENCES TO RELATED APPLICATIONS

The present disclosure claims benefit of Chinese Application No. 202311593343.9, filed with China National Intellectual Property Administration on Nov. 27, 2023, the contents of which are hereby incorporated by reference in its entirety.

FIELD

The present disclosure relates to the field of household appliances, and particularly relates to a food processing machine and a motor.

BACKGROUND

Currently, a food processing machine in related art is limited by the sizes of components such as a motor and a heating plate, and thus this renders the appearance of the food processing machine relatively bulky, and it is usually difficult for users to store and carry it, and it is also difficult to lift and place a cup body.

SUMMARY

The present disclosure aims to solve at least one of the problems in the prior art or the related art.

Thus, the embodiment of the present disclosure provides a food processing machine.

The embodiment of the present disclosure provides a motor.

In view of this, the present disclosure provides a food processing machine, comprising: a base assembly; a cup body assembly, capable of being mounted on the base assembly, and the cup body assembly comprises a cutting tool component; a motor, and the motor comprises a stator component and a rotor component, the stator component is provided in the base assembly, the rotor component brings the cutting tool component to rotate, and the stator assembly can drive the rotor component to rotate, and, a magnetic force line between the stator component and the rotor component, along the direction of a rotating axis of the rotor component, points at an S-pole of the rotor component from an N-pole of the stator component and points at an S-pole of the stator component from an N-pole of the rotor component; a magnetic force line inside the stator component points at the N-pole of the stator component from the S-pole of the stator component along a circumferential direction of the stator component, and a magnetic force line inside the rotor component points at the N-pole of the rotor component from the S-pole of the rotor component along a circumferential direction of the rotor component.

The food processing machine provided by the present disclosure comprises the base assembly, the cup body assembly and the motor; the cup body assembly can be mounted on the base assembly; the motor comprises the stator component and the rotor component, the stator component is provided in the base assembly, the stator assembly can drive the rotor component to rotate, and the rotor component can bring the cutting tool component to rotate, to further achieve processing food materials. In one embodiment, the magnetic force line inside the stator component points at the N-pole of the stator component from the S-pole of the stator component along the circumferential direction of the stator component, and the magnetic field of the stator component rotates along the circumferential direction, the N-pole of the stator component generates a repulsive force to the N-pole of the rotor component, the S-pole of the stator component generates an attractive force to the N-pole of the rotor component, the S-pole of the stator component generates a repulsive force to the N-pole of the rotor component, the N-pole of the stator component generates an attractive force to the S-pole of the rotor component, the electromagnetic forces to the N-pole and the S-pole of the rotor component along the axial direction of the rotor component counteract each other, the direction of a resultant force is the electromagnetic force along the circumferential direction, and therefore, when the magnetic field of the stator component rotates along the circumferential direction, the rotor component will also rotate along the same direction, and furthermore, under the effect of the stator component, the rotating of the rotor component is achieved; through the rotating of the rotor component, the rotating of the cutting tool component is achieved, and furthermore, the processing of foods is achieved; in addition, through the distribution of the magnetic fields of the stator component and the rotor component, an axial magnetic flux of the motor is achieved, and then, the stator component and the rotor component can be arranged separately along an axial direction; when storing, users can separately store a portion with the stator component and a portion with the rotor component, and then the convenience for storage and carriage is improved.

It is understandable that the stator component comprises a coil, and the magnetic field generated when the coil is electrified with a three-phase alternating current rotates in the circumferential direction.

In one embodiment, when the magnetic field of the stator component rotates along the circumferential direction, the rotor component will also rotate along the same direction at the same speed.

The food processing machine provided in the present disclosure can further have the following additional embodiments.

In some embodiment, in one embodiment, the rotor component is provided inside the cup body assembly, and along the direction of the rotating axis of the rotor component, the rotor component is located at one side of the stator component.

In the embodiment, the stator component is provided inside the base assembly, the rotor component is provided inside the cup body assembly, and the rotor component is connected to the cutting tool component; due to the interaction between the magnetic field of the stator component and the magnetic field of the rotor component, the rotor component can rotate and further bring the cutting tool component to rotate, to achieve the processing to the food materials in the cup body assembly. In one embodiment, the rotor component is provided at a side of the stator component in an axial direction, and through a principle of axial magnetic flux coupling, the separation of the rotor component from the stator component is achieved, meanwhile, the thickness of the motor along the axial direction and the weight of the motor can also be reduced, and this further helps reduce the height and weight of the whole food processing machine, and is convenient for storing and carrying the food processing machine. In addition, as the stator component is disposed separately from the rotor component, it is not necessary to dispose a connecting shaft which penetrates the cup body assembly to achieve power transmission, the sealing performance of the cup body assembly is improved, and the noise is lowered during the working of the food processing machine.

In some embodiment, in one embodiment, along the direction of the rotating axis of the rotor component, the gap between the rotor component and the stator component is greater than 0 mm, and is less than or equal to 5 mm.

In the embodiment, if the axial gap between the rotor component and the stator component is too large, the transmission of magnetic chain and torque between them is affected, and the efficiency of the motor is lowered; if the number of inductive turns is increased and magnetic flux is increased to compensate, this will result in an excessively high cost, and therefore, along the direction of the rotating axis of the rotor component, the gap between the rotor component and the stator component is disposed to be less than or equal to 5 mm, and this ensures the performances of the motor such as inductance, resistance, starting torque and magnetic flux.

In some embodiments, in one embodiment, the rotor component comprises: a first magnetic conductive cover, fixedly connected to the cutting tool component; a second magnetic conductive cover, connected to the first magnetic conductive cover, and enclosing a mounting cavity together with the first magnetic conductive cover; a first magnetic member, provided in the mounting cavity, and the N-pole of the rotor component comprises the N-pole of the first magnetic member, and the S-pole of the rotor component comprises the S-pole of the first magnetic member.

In the embodiment, the rotor component comprises the first magnetic conductive cover, the second magnetic conductive cover and the first magnetic member, the first magnetic conductive cover is connected to the second magnetic conductive cover, and the mounting cavity is enclosed by the first magnetic conductive cover and the second magnetic conductive cover, the first magnetic member is provided in the mounting cavity, and this achieves limiting and mounting the first magnetic member; meanwhile, the arrangement of the first magnetic conductive cover and the second magnetic conductive cover also ensures a magnetic flux effect and further ensures the driving performance of the motor; the N-pole of the rotor component comprises the N-pole of the first magnetic member, the S-pole of the rotor component comprises the S-pole of the first magnetic member, the N-pole of the stator component points at the S-pole of the first magnetic member along the direction of the rotating axis of the rotor component, the N-pole of the first magnetic member points at the S-pole of the stator component along the direction of the rotating axis of the rotor component, and the first magnetic member rotates about the rotating axis of the rotor component.

In one embodiment, the N-pole of the rotor component is the N-pole of the first magnetic member, and the S-pole of the rotor component is the S-pole of the first magnetic member. The magnetic force line inside the first magnetic member points at the N-pole of the first magnetic member from the S-pole of the first magnetic member along the circumferential direction of the first magnetic member. The N-pole of the stator component points at the S-pole of the first magnetic member along the direction of the rotating axis of the rotor component, and the N-pole of the first magnetic member points at the S-pole of the stator component along the direction of the rotating axis of the rotor component.

In some embodiments, in one embodiment, the first magnetic member is disc-shaped or ring-shaped.

In the embodiment, the first magnetic member can be disc-shaped, and this can improve the magnetic flux and the torque of the motor; the first magnetic member can also present ring-shaped, and this can guide and dissipate heat through a hollow portion, to ensure relatively low temperature rise of the motor, slowing down the aging rate of the materials of the motor, and improving the operation stability and the service life of the motor.

In some embodiments, in one embodiment, the base assembly comprises: a first base body, and the stator component is provided in the first base body, and arranged opposite to the rotor component from top to bottom; and an isolation cover, provided on the top portion of the first base body, and the cup body assembly can be placed on the isolation cover.

In the embodiment, the base assembly comprises the first base body and the isolation cover; the isolation cover is provided on the top portion of the first base body, and the cup body assembly can be placed on the isolation cover, and thus the separation between the stator component and the rotor component is achieved, an eddy current phenomenon between them is reduced or eliminated, and the magnetic field coupling performance between the stator component and the rotor component is further enhanced.

In some embodiments, in one embodiment, the isolation cover comprises a non-metallic member; and/or along the direction of the rotating axis of the rotor component, the thickness of the isolation cover is less than or equal to 5 mm.

In the embodiment, the isolation cover comprises the non-metallic member, and arranging the non-metallic member between the rotor component and the stator component can decrease or eliminate the eddy current phenomenon between them, and further enhance the magnetic field coupling performance between the stator component and the rotor component. In one embodiment, if the thickness of the isolation cover is too large, the transmission of magnetic chain and torque between the stator component and the rotor component will be affected, and the efficiency of the motor will be lowered; and therefore, the thickness of the isolation cover is disposed to be less than or equal to 5 mm, the reliability of the torque transmission between the stator component and the rotor component is ensured while the eddy current is decreased or eliminated.

In one embodiment, the surface where the isolation cover contacts the cup body assembly is a smooth and continuous plane, a curved surface, or a cambered surface, and can be cleaned easily.

In one embodiment, when the cup body assembly is placed on the isolation cover, it can be placed in any direction of circumferential 360°, and users do not need to spend time in accurately locating and aligning, and it is very convenient in use.

In one embodiment, the first base body is provided with an opening, and the isolation cover is provided at the opening. In one embodiment, along the axial direction of the rotor component, the surface of the isolation cover facing the cup body assembly is lower than the surface of the first base body facing the cup body assembly, and the isolation cover is lower than the first base body, and then a groove can be formed at the opening, and this helps the cooperation between the cup body assembly and the base assembly.

The first base body may not be provided with the opening, i.e., the top portion of the first base body is a plane. For example, the isolation cover and the first base body can be integrally formed, and the first base body does not need to be provided with the opening. Or, the first base body is directly formed to be a plane, and the isolation cover is disposed on the plane.

In some embodiments, in one embodiment, the base assembly further comprises: a damping member, provided between the stator component and the first base body, and on the bottom of the first base body.

In the embodiment, the base assembly further comprises the damping member, the damping member is provided between the stator component and the first base body and provided on the bottom of the first base body, and can reduce the vibration generated during the operation of the stator component, and further reduce the noise during the operation of the food processing machine.

In some embodiments, in one embodiment, the cup body assembly further comprises: a cup body; a second base body, and the second base body is provided at one end of the cup body, and encloses a cavity together with the cup body; the cutting tool component is provided in the cavity and divides the cavity into a first cavity and a second cavity, a portion of the cutting tool component is provided in the first cavity and the other portion extends into the second cavity, and the rotor component is provided in the second cavity and connected to the cutting tool component; and a sealing member, provided at a connection portion between the cup body and the second base body, and used for sealing the second cavity.

In the embodiment, the cup body assembly further comprises the cup body, the second base body and the sealing member. The second base body and the cup body enclose the cavity, the cutting tool component is provided in the cavity and divides the cavity into the first cavity and the second cavity, the first cavity is configured to hold food materials, a portion of the cutting tool component extends into the first cavity, and the other portion is located in the second cavity and connected to the rotor component in the second cavity; the rotor component drives the cutting tool component to rotate, and brings the portion of the cutting tool component located in the first cavity to rotate, to achieve processing the food materials in the first cavity. In one embodiment, the sealing member is provided at the connection portion between the second base body and the cup body, and achieves sealing the second cavity, and this further enables washing the entire cup body assembly with water, and thus the convenience of cleaning is improved.

In some embodiments, in one embodiment, the cutting tool component comprises: a rotating shaft, and a portion of the rotating shaft is located in the first cavity, a portion of the rotating shaft is located in the second cavity, and the rotor component is fixed to the end portion of the rotating shaft through a connecting member; and a cutting tool, provided on the portion of the rotating shaft located in the first cavity.

In the embodiment, the cutting tool component comprises the rotating shaft and the cutting tool, a portion of the rotating shaft is located in the first cavity and used for mounting the cutting tool, a portion of the rotating shaft is located in the second cavity and used for connecting the rotor component, and then the processing of food materials by the cutting tool is achieved through the rotating of the rotor component.

In some embodiments, the cutting tool component further comprises: a chassis, provided in the cavity, and dividing the cavity into the first cavity and the second cavity, and the rotating shaft penetrates the chassis.

In the embodiment, the cutting tool component further comprises the chassis, the chassis is provided in the cavity and divides the cavity into the first cavity and the second cavity, to achieve the separation of the food materials from structural members such as the rotor component; the rotating shaft penetrates the chassis, and further transmits the driving force of the rotor component in the second cavity to the cutting tool in the first cavity.

In some embodiments, in one embodiment, the second base body comprises a first mating surface, the isolation cover comprises a second mating surface, and the first mating surface can be in limiting cooperation with the second mating surface.

In the embodiment, the second base body comprises the first mating surface, the isolation cover comprises the second mating surface, and the first mating surface can be in limiting cooperation with the second mating surface, to achieve accurate positioning of the cup body assembly and the base assembly, ensuring the relative position of the stator component and the rotor component, and further ensuring the interaction of the magnetic fields between the stator component and the rotor component.

In some embodiments, in one embodiment, the first mating surface comprises any of the following types: a convex surface, a concave surface and a plane; the second mating surface comprises any of the following types: a convex surface, a concave surface and a plane.

In the embodiment, the first mating surface can be a convex surface, a concave surface or a plane, and correspondingly, the second mating surface is a convex surface, a concave surface or a plane which can cooperate with the first mating surface.

In some embodiments, in one embodiment, a first limiting portion is provided on the first mating surface, a second limiting portion is provided on the second mating surface, and the first limiting portion is in limiting cooperation with the second limiting portion.

In the embodiment, the first limiting portion is further provided on the first mating surface, and the second limiting portion which is in limiting cooperation with the first limiting portion is provided on the second mating surface, to further improve the accurate positioning of the cup body assembly and the base assembly.

In some embodiments, in one embodiment, the food processing machine further comprises: a first magnetic conductive member, provided in the cup body assembly; a second magnetic member, provided on the rotor component or the cutting tool component, and, under the circumstance that the stator component is electrified and generates a magnetic field, the rotor component can bring the second magnetic member to rotate, to make the first magnetic conductive member heat the cup body assembly.

In the embodiment, the food processing machine further comprises the first magnetic conductive member and the second magnetic member, the first magnetic conductive member is provided in the cup body assembly, and the second magnetic member is provided on the rotor component or the cutting tool component; due to the interaction between the magnetic field of the stator component and the magnetic field of the rotor component, the rotor component is driven to rotate, and the cutting tool component and the second magnetic member are brought to rotate, and the rotation of the cutting tool component can achieve processing the food materials in the cup body assembly; the rotation of the second magnetic member can generate a rotating magnetic field, and then the first magnetic conductive member cuts a magnetic induction line and generates heat, to achieve heating the food materials inside the cup body assembly.

In some embodiments, in one embodiment, the second magnetic member is provided on the outer peripheral wall of the rotor component, and along the axial direction of the rotor component, the distance between the second magnetic member and the stator component is greater than or equal to 2 mm and less than or equal to 3 mm; and/or the first magnetic conductive member is the chassis of the cutting tool component.

In the embodiment, along the axial direction of the rotor component, the distance between the second magnetic member and the stator component is disposed to be in a range of 2 mm to 3 mm, and this ensures the reliability of the second magnetic member rotating with the rotor component; the first magnetic conductive member is the chassis of the cutting tool component, and this further improves the heating effect to the food materials inside the first cavity of the cup body assembly.

In some embodiments, in one embodiment, the food processing machine further comprises: a second magnetic conductive member, provided inside the cup body assembly; a coil is provided on the base assembly, and in the case that the coil is electrified, the second magnetic conductive member can heat the cup body assembly.

In the embodiment, the food processing machine further comprises the second magnetic member, the second magnetic member is provided inside the cup body assembly, the coil is provided on the base assembly; in the case that the coil is electrified, the second magnetic conductive member can be made to cut the magnetic induction line generated by the coil, and is further made to generate heat, to achieve heating the cup body assembly.

In some embodiments, in one embodiment, the stator component comprises the coil; and/or the second magnetic conductive member is provided on the outer peripheral wall of the rotor component; or the second magnetic conductive member is the chassis of the cutting tool component.

In the embodiment, the coil is a portion of the stator component, and thus, when the stator component works, it can drive the rotor component to rotate, to achieve driving the cutting tool component; when the stator component stops working, the coil of the stator component can be configured to generate a magnetic field, and the second magnetic conductive member cuts the magnetic field generated by the coil, to generate an eddy current, and thus achieving heating the food materials inside the cup body assembly. In one embodiment, the second magnetic conductive member can be provided on the outer peripheral wall of the rotor component, to facilitate the mounting of the second magnetic conductive member. In one embodiment, the second magnetic conductive member is the chassis of the cutting tool component, and then directly contacts the food materials inside the first cavity of the cup body assembly, and this improves the heating effect to the food materials.

In some embodiments, in one embodiment, the stator component comprises a stator iron core, the stator iron core comprises multiple layers of laminations, a central through-hole is enclosed by the multiple layers of laminations, and the multiple layers of laminations are in stacked distribution in a radial direction of the central through-hole.

In the embodiment, the stator iron core comprises multiple layers of laminations, the central through-hole is enclosed by the multiple layers of laminations, and the multiple layers of laminations are in stacked distribution in the radial direction of the central through-hole, and thus this can further effectively reduce the magnetic resistance of the stator iron core, reduce magnetic loss and improve the efficiency of the motor, and the magnetic circuit of the stator iron core is shorter, the motor can be made flatter and thinner, and the miniaturization of the motor can be achieved.

In some embodiments, in one embodiment, the multiple layers of laminations are formed by rolling and stacking one lamination along a spiral line from inside to outside.

In the embodiment, in the process of machining and manufacturing the stator iron core, the final stator iron core can be obtained by convolving one lamination, and the manufacturing process is simple, to reduce the cost of the stator iron core.

In some embodiments, in one embodiment, the stator component further comprises: a third base body; a support, provided within the third base body, and the support comprises a base and a winding portion provided on the base, an avoidance gap is provided in the base, and the winding portion extends along the avoidance gap towards the direction deviating from the base; the coil, winding the winding portion, and the N-pole of the stator component comprises the N-pole of the coil, the S-pole of the stator component comprises the S-pole of the coil, and at least one end surface of the stator iron core is opened with multiple winding grooves, the winding grooves penetrate the interior of the stator iron core from the outer surface of the stator iron core, the multiple winding grooves are distributed along the circumferential direction of the stator iron core, two adjacent winding grooves define a stator tooth, the stator tooth penetrates the base from the avoidance gap, and the stator tooth is separated from the coil through the winding portion.

In the embodiment, the stator component further comprises the third base body, the support and the coil, the N-pole of the stator component comprises the N-pole of the coil, and the S-pole of the stator component comprises the S-pole of the coil; in the case that the coil is electrified, the N-pole of the coil points at the S-pole of the rotor component along the direction of the rotating axis of the rotor component, the N-pole of the rotor component points at the S-pole of the coil along the direction of the rotating axis of the rotor component, and the rotor component rotates about the rotating axis. The support is provided within the third base body, the support comprises the base and the winding portion arranged on the base, the stator tooth of the stator iron core penetrates the base from the avoidance gap in the base, and then the winding portion sleeves on the stator tooth, and the coil winds around the stator tooth through the winding portion. In one embodiment, at least one end surface of the stator iron core is provided with multiple winding grooves for providing a placing position for the winding portion which cooperates with them; in addition, the winding portion and the stator iron core are mounted in an embedded manner, and this can effectively lower the volume of the stator component and achieve the minimization of the motor.

In one embodiment, the N-pole of the stator component is the N-pole of the coil, and the S-pole of the stator component is the S-pole of the coil. In the case that the coil is electrified, along the circumferential direction of the coil, the magnetic force line inside the coil points at the N-pole of the coil from the S-pole of the coil; the N-pole of the coil points at the S-pole of the first magnetic member along the direction of the rotating axis of the rotor component, and the N-pole of the first magnetic member points at the S-pole of the coil along the direction of the rotating axis of the rotor component.

In some embodiments, in one embodiment, the end of the winding portion deviating from the base is provided with a flanging structure, and the winding portion is located between the flanging structure and the base.

In the embodiment, the end of the winding portion deviating from the base is provided with the flanging structure, the flanging structure, the base and the winding portion jointly configure a limiting space, the coil is provided in the limiting space and disposed winding the winding portion, and this can ensure the stable mounting of the coil and prevent the coil from falling off.

In some embodiments, in one embodiment, the side wall of the third base body is provided with multiple heat dissipation holes.

In the embodiment, the side wall of the third base body is provided with multiple heat dissipation holes, and this can improve the heat dissipation efficiency of the stator component in the third base body, further improve the heat dissipation effect of the motor, slow down the aging rate of the motor, and prolong the service life of the motor.

In some embodiments, in one embodiment, the stator iron core is disc-shaped or ring-shaped.

In the embodiment, the stator iron core is disc-shaped, and this can achieve high magnetic flux and high torque, and further improve the driving effect to the cutting tool component. The stator iron core can also be ring-shaped, the hollow portion can increase the heat dissipation effect, and this slows down the aging rate of the motor.

One embodiment of the present disclosure also provides a motor, comprising: a stator component; a rotor component, and the stator component can drive the rotor component to rotate, and a magnetic force line between the stator component and the rotor component, along the direction of a rotating axis of the rotor component, points at an S-pole of the rotor component from an N-pole of the stator component and points at an S-pole of the stator component from an N-pole of the rotor component; a magnetic force line inside the stator component points at the N-pole of the stator component from the S-pole of the stator component along a circumferential direction of the stator component, and a magnetic force line inside the rotor component points at the N-pole of the rotor component from the S-pole of the rotor component along a circumferential direction of the rotor component.

According to the motor provided by the present disclosure, the magnetic force line inside the stator component points at the N-pole of the stator component from the S-pole of the stator component along the circumferential direction of the stator component, and the magnetic field of the stator component rotates along the circumferential direction, the N-pole of the stator component generates a repulsive force to the N-pole of the rotor component, the S-pole of the stator component generates an attractive force to the N-pole of the rotor component, the S-pole of the stator component generates a repulsive force to the N-pole of the rotor component, the N-pole of the stator component generates an attractive force to the S-pole of the rotor component, the electromagnetic forces to the N-pole and the S-pole of the rotor component along the axial direction of the rotor component counteract each other, the direction of a resultant force is the electromagnetic force along the circumferential direction, and therefore, when the magnetic field of the stator component rotates along the circumferential direction, the rotor component will also rotate along the same direction, and furthermore, under the effect of the stator component, the rotating of the rotor component is achieved; through the rotating of the rotor component, the output of the driving force is achieved; in addition, through the distribution of the magnetic fields of the stator component and the rotor component, an axial magnetic flux of the motor is achieved, and then, the stator component and the rotor component can be arranged separately along an axial direction; when storing, users can separately store a portion with the stator component and a portion with the rotor component, and then the convenience for storage and carriage is improved.

It is understandable that the stator component comprises a coil, and the magnetic field generated when the coil is electrified with a three-phase alternating current rotates in the circumferential direction.

In one embodiment, when the magnetic field of the stator component rotates along the circumferential direction, the rotor component will also rotate along the same direction at the same speed.

In some embodiments, in one embodiment, along the direction of the rotating axis of the rotor component, the rotor component is located at one side of the stator component.

In the embodiment, the rotor component is provided at a side of the stator component in an axial direction, and through a principle of axial magnetic flux coupling, in the case of ensuring the driving connection between the stator component and the rotor component, the separation of the rotor component from the stator component is achieved, meanwhile, the thickness of the motor along the axial direction and the weight of the motor can also be reduced, and this is further convenient for storing and carrying the motor.

In some embodiments, in one embodiment, along the direction of the rotating axis of the rotor component, the gap between the rotor component and the stator component is greater than 0 mm, and is less than or equal to 5 mm.

In the embodiment, if the axial gap between the rotor component and the stator component is too large, the transmission of magnetic chain and torque between them is affected, and the efficiency of the motor is lowered; if the number of inductive turns is increased and magnetic flux is increased to compensate, this will result in an excessively high cost, and therefore, along the direction of the rotating axis of the rotor component, the gap between the rotor component and the stator component is disposed to be less than or equal to 5 mm, and this ensures the performances of the motor such as inductance, resistance, starting torque and magnetic flux.

In some embodiments, in one embodiment, the rotor component comprises: a first magnetic conductive cover; a second magnetic conductive cover, connected to the first magnetic conductive cover and enclosing a mounting cavity together with the first magnetic conductive cover; a first magnetic member, provided in the mounting cavity, and, the N-pole of the rotor component comprises the N-pole of the first magnetic member, and the S-pole of the rotor component comprises the S-pole of the first magnetic member.

In the embodiment, the rotor component comprises the first magnetic conductive cover, the second magnetic conductive cover and the first magnetic member, the first magnetic conductive cover is connected to the second magnetic conductive cover, and the mounting cavity is enclosed by the first magnetic conductive cover and the second magnetic conductive cover, the first magnetic member is provided in the mounting cavity, and this achieves limiting and mounting the first magnetic member; meanwhile, the arrangement of the first magnetic conductive cover and the second magnetic conductive cover also ensures a magnetic flux effect and further ensures the driving performance of the motor; the N-pole of the rotor component comprises the N-pole of the first magnetic member, the S-pole of the rotor component comprises the S-pole of the first magnetic member, the N-pole of the stator component points at the S-pole of the first magnetic member along the direction of the rotating axis of the rotor component, the N-pole of the first magnetic member points at the S-pole of the stator component along the direction of the rotating axis of the rotor component, and the first magnetic member rotates about the rotating axis of the rotor component.

In one embodiment, the N-pole of the rotor component is the N-pole of the first magnetic member, and the S-pole of the rotor component is the S-pole of the first magnetic member. The magnetic force line inside the first magnetic member points at the N-pole of the first magnetic member from the S-pole of the first magnetic member along the circumferential direction of the first magnetic member. The N-pole of the stator component points at the S-pole of the first magnetic member along the direction of the rotating axis of the rotor component, and the N-pole of the first magnetic member points at the S-pole of the stator component along the direction of the rotating axis of the rotor component.

In some embodiments, in one embodiment, the first magnetic member is disc-shaped or ring-shaped.

In the embodiment, the first magnetic member can be disc-shaped, and this can improve the magnetic flux and the torque of the motor; the first magnetic member can also be ring-shaped, and this can guide and dissipate heat through a hollow portion, to ensure relatively low temperature rise of the motor, slowing down the aging rate of the materials of the motor, and improving the operation stability and the service life of the motor.

In some embodiments, in one embodiment, the stator component comprises a stator iron core, the stator iron core comprises multiple layers of laminations, a central through-hole is enclosed by the multiple layers of laminations, and the multiple layers of laminations are in stacked distribution in a radial direction of the central through-hole.

In the embodiment, the stator iron core comprises multiple layers of laminations, the central through-hole is enclosed by the multiple layers of laminations, and the multiple layers of laminations are in stacked distribution in the radial direction of the central through-hole, and thus this can further effectively reduce the magnetic resistance of the stator iron core, reduce magnetic loss and improve the efficiency of the motor, and the magnetic circuit of the stator iron core is shorter, the motor can be made flatter and thinner, and the miniaturization of the motor can be achieved.

In some embodiments, in one embodiment, the multiple layers of laminations are formed by rolling and stacking one lamination along a spiral line from inside to outside.

In the embodiment, in the process of machining and manufacturing the stator iron core, the final stator iron core can be obtained by convolving one lamination, and the manufacturing process is simple, to reduce the cost of the stator iron core.

In some embodiments, in one embodiment, the stator component further comprises: a third base body; a support, provided within the third base body, and the support comprises a base and a winding portion provided on the base, an avoidance gap is provided in the base, and the winding portion extends along the avoidance gap towards the direction deviating from the base; a coil, wound on the winding portion, and the N-pole of the stator component comprises the N-pole of the coil, the S-pole of the stator component comprises the S-pole of the coil, and at least one end surface of the stator iron core is opened with multiple winding grooves, the winding grooves penetrate the interior of the stator iron core from the outer surface of the stator iron core, the multiple winding grooves are distributed along the circumferential direction of the stator iron core, two adjacent winding grooves define a stator tooth, the stator tooth penetrates the base from the avoidance gap, and the stator tooth is separated from the coil through the winding portion.

In the embodiment, the stator component further comprises the third base body, the support and the coil, the N-pole of the stator component comprises the N-pole of the coil, and the S-pole of the stator component comprises the S-pole of the coil; in the case that the coil is electrified, the N-pole of the coil points at the S-pole of the rotor component along the direction of the rotating axis of the rotor component, the N-pole of the rotor component points at the S-pole of the coil along the direction of the rotating axis of the rotor component, and the rotor component rotates about the rotating axis. The support is provided within the third base body, the support comprises the base and the winding portion arranged on the base, the stator tooth of the stator iron core penetrates the base from the avoidance gap in the base, and then the winding portion sleeves on the stator tooth, and the coil winds around the stator tooth through the winding portion. In one embodiment, at least one end surface of the stator iron core is provided with multiple winding grooves for providing a placing position for the winding portion which cooperates with them; in addition, the winding portion and the stator iron core are mounted in an embedded manner, and this can effectively lower the volume of the stator component and achieve the minimization of the motor.

In one embodiment, the N-pole of the stator component is the N-pole of the coil, and the S-pole of the stator component is the S-pole of the coil. In the case that the coil is electrified, along the circumferential direction of the coil, the magnetic force line inside the coil points at the N-pole of the coil from the S-pole of the coil; the N-pole of the coil points at the S-pole of the first magnetic member along the direction of the rotating axis of the rotor component, and the N-pole of the first magnetic member points at the S-pole of the coil along the direction of the rotating axis of the rotor component.

In some embodiments, in one embodiment, the end of the winding portion deviating from the base is provided with a flanging structure, and the winding portion is located between the flanging structure and the base.

In the embodiment, the end of the winding portion deviating from the base is provided with the flanging structure, the flanging structure, the base and the winding portion jointly configure a limiting space, the coil is provided in the limiting space and disposed winding the winding portion, and this can ensure the stable mounting of the coil and prevent the coil from falling off.

In some embodiments, in one embodiment, the side wall of the third base body is provided with multiple heat dissipation holes.

In the embodiment, the side wall of the third base body is provided with multiple heat dissipation holes, and this can improve the heat dissipation efficiency of the stator component in the third base body, further improve the heat dissipation effect of the motor, slow down the aging rate of the motor, and prolong the service life of the motor.

In some embodiments, in one embodiment, the stator iron core is disc-shaped or ring-shaped.

In the embodiments, the stator iron core is disc-shaped, and this can achieve high magnetic flux and high torque, and further improve the driving effect to the cutting tool component. The stator iron core can also be ring-shaped, the hollow portion can increase the heat dissipation effect, and this slows down the aging rate of the motor.

In one embodiment, the motor comprises an axial flux motor.

The embodiments of the present disclosure will be obvious in the following description, or can be understood through the implementation of the present disclosure.

BRIEF DESCRIPTION OF THE DRAWINGS

The above and/or additional embodiments of the present disclosure will be obvious and understood easily from the following description of the embodiments in combination with the accompanying drawings.

Figure 1:
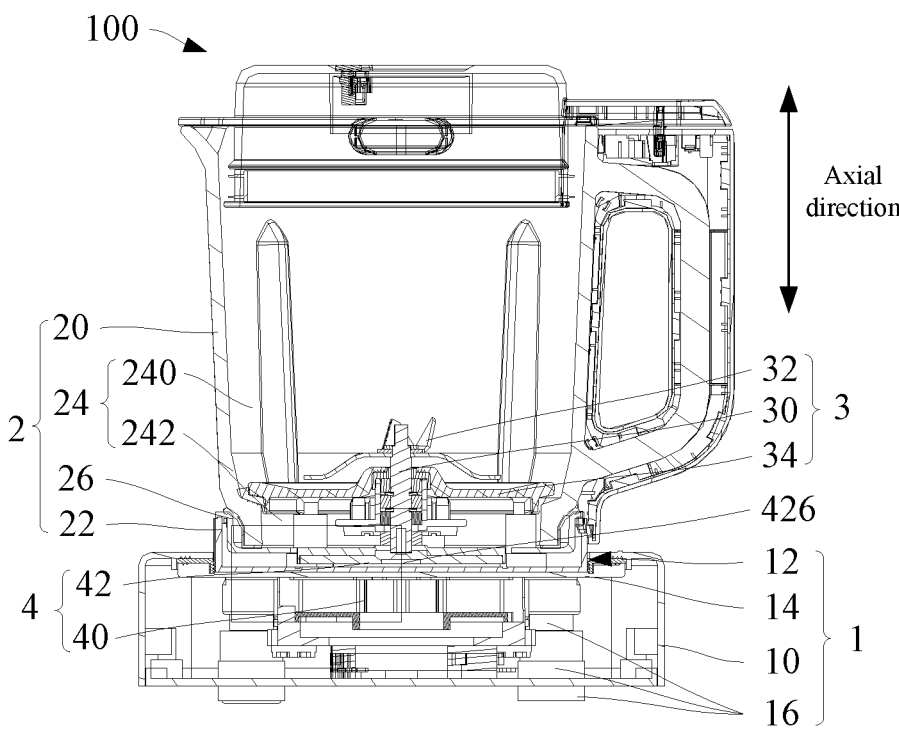
FIG. 1 is a first schematic view of the structure of a food processing machine according to an embodiment of the present disclosure.
Figure 2:
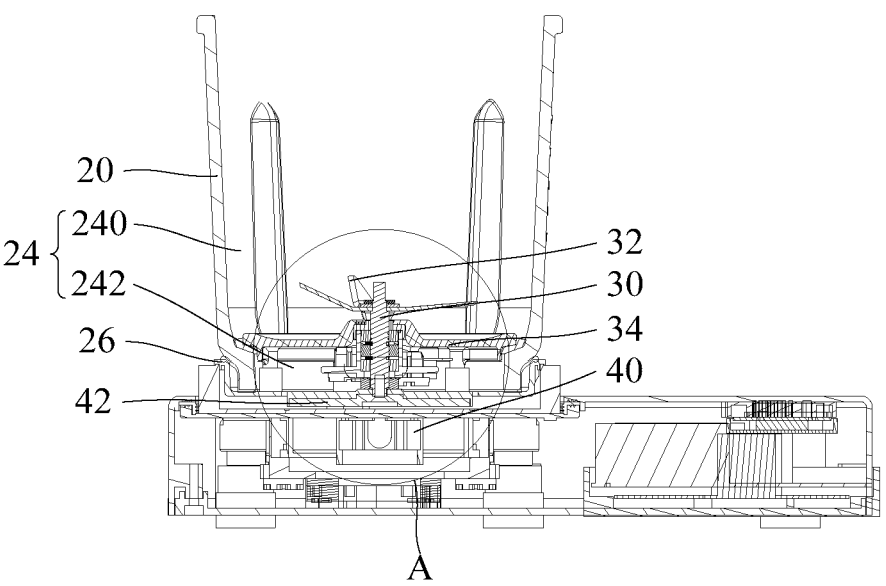
FIG. 2 is a second schematic view of the structure of a food processing machine according to an embodiment of the present disclosure.

The corresponding relationships between the reference signs and the component names in FIG. 1 to FIG. 10 are as follows:

1: base assembly, 10: first base body, 12: opening, 14: isolation cover, 140: second mating surface, 16: damping member, 2: cup body assembly, 20: cup body, 22: second base body, 220: first mating surface, 24: cavity, 240: first cavity, 242: second cavity, 26: sealing member, 3: cutting tool component, 30: rotating shaft, 32: cutting tool, 34: chassis, 36: sliding bearing, 38: end surface bearing, 39: support plate, 4: motor, 40: stator component, 400: stator iron core, 4000: winding groove, 4002: stator tooth, 402: third base body, 4020: heat dissipation hole, 404: support, 4040: base, 4042: winding portion, 4044: avoidance gap, 4046: flanging structure, 406: coil, 42: rotor component, 420: first magnetic conductive cover, 422: second magnetic conductive cover, 424: first magnetic member, 426: screw, 5: first magnetic conductive member, 6: second magnetic member, 7: second magnetic conductive member, and 100: food processing machine.

DETAILED DESCRIPTION OF THE DISCLOSURE

To more clearly understand the above purposes, features and advantages of the present disclosure, the present disclosure will be further detailed hereinafter in combination with the accompanying drawings and embodiments. It should be indicated that in the case of no conflict, the embodiments and the features in the embodiments of the present disclosure can be combined with each other.

Many details are illustrated in the following description for the convenience of a thorough understanding to the present disclosure, but the present disclosure can also be implemented using other embodiments other than these described herein. Therefore, the protection scope of the present disclosure is not limited to the specific embodiments disclosed in the following text.

A food processing machine 100 and a motor 4 according to some embodiments of the present disclosure are described in the following by referring to FIG. 1 to FIG. 10.

As shown in FIG. 1, FIG. 2, FIG. 3, FIG. 4, FIG. 9 and FIG. 10, according to an embodiment of the present disclosure, the present disclosure provides a food processing machine 100, comprising: a base assembly 1, a cup body assembly 2 and a motor 4.

In one embodiment, the cup body assembly 2 can be mounted on the base assembly 1, and the cup body assembly 2 comprises a cutting tool component; the motor 4 comprises a stator component 40 and a rotor component 42, the stator component 40 is provided in the base assembly 1, the rotor component 42 brings the cutting tool component to rotate, and the stator assembly 40 can drive the rotor component 42 to rotate, wherein, a magnetic force line between the stator component 40 and the rotor component 42, along the direction of a rotating axis of the rotor component 42, points at an S-pole of the rotor component 42 from an N-pole of the stator component 40 and points at an S-pole of the stator component 40 from an N-pole of the rotor component 42; a magnetic force line inside the stator component 40 points at the N-pole of the stator component 40 from the S-pole of the stator component 40 along a circumferential direction of the stator component 40, and a magnetic force line inside the rotor component 42 points at the N-pole of the rotor component 42 from the S-pole of the rotor component 42 along a circumferential direction of the rotor component 42.

The food processing machine 100 provided by the present disclosure comprises the base assembly 1, the cup body assembly 2 and the motor 4; the cup body assembly 2 can be mounted on the base assembly 1; the motor 4 comprises the stator component 40 and the rotor component 42, the stator component 40 is provided in the base assembly 1, the stator assembly 40 can drive the rotor component 42 to rotate, and the rotor component 42 can bring a cutting tool component 3 to rotate, to further achieve processing food materials. In one embodiment, the rotor component 42 brings the cutting tool component to rotate to further achieve processing food materials. In one embodiment, the magnetic force line inside the stator component 40 points at the N-pole of the stator component 40 from the S-pole of the stator component 40 along the circumferential direction of the stator component 40, and the magnetic field of the stator component 40 rotates along the circumferential direction, the N-pole of the stator component 40 generates a repulsive force to the N-pole of the rotor component 42, the S-pole of the stator component 40 generates an attractive force to the N-pole of the rotor component 42, the S-pole of the stator component 40 generates a repulsive force to the N-pole of the rotor component 42, the N-pole of the stator component 40 generates an attractive force to the S-pole of the rotor component 42, the electromagnetic forces to the N-pole and the S-pole of the rotor component 42 along the axial direction of the rotor component 42 counteract each other, the direction of a resultant force is the electromagnetic force along the circumferential direction, and therefore, when the magnetic field of the stator component 40 rotates along the circumferential direction, the rotor component 42 will also rotate along the same direction, and furthermore, under the effect of the stator component 40, the rotating of the rotor component 42 is achieved; through the rotating of the rotor component 42, the rotating of the cutting tool component is achieved, and furthermore, the processing of foods is achieved; in addition, through the distribution of the magnetic fields of the stator component 40 and the rotor component 42, an axial magnetic flux of the motor 4 is achieved, and then, the stator component 40 and the rotor component 42 can be arranged separately along an axial direction; when storing, users can separately store a portion with the stator component 40 and a portion with the rotor component 42, and then the convenience for storage and carriage is improved.

It is understandable that the stator component 40 comprises a coil, and the magnetic field generated when the coil is electrified with a three-phase alternating current rotates in the circumferential direction.

In one embodiment, when the magnetic field of the stator component 40 rotates along the circumferential direction, the rotor component 42 will also rotate along the same direction at the same speed.

Figure 9:
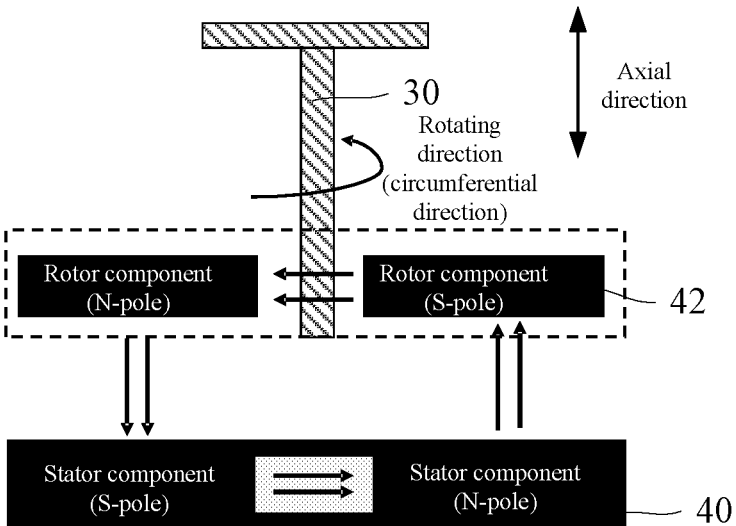
FIG. 9 is a first principle diagram of a motor according to an embodiment of the present disclosure.
Figure 10:
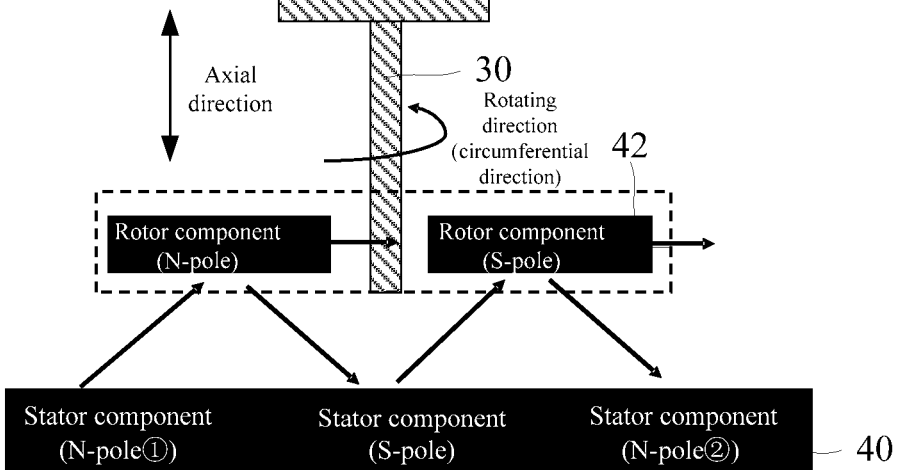
FIG. 10 is a second principle diagram of a motor according to an embodiment of the present disclosure.

It is understandable that the stator component 40 comprises multiple N-poles (for example, N-pole ① and N-pole ②) and multiple S-poles, In one embodiment, as shown in FIG. 9 and FIG. 10, the N-pole ① of the stator component 40 generates a repulsive force to the N-pole of the rotor component 42, the S-pole of the stator component 40 generates an attractive force and a repulsive force respectively to N-pole and the S-pole of the rotor component 42; the N-pole ② of the stator component 40 generates an attractive force to the S-pole of the rotor component 42, the electromagnetic forces to the N-pole and the S-pole of the rotor component 42 along the axial direction counteract each other, the direction of a resultant force is the electromagnetic force along the circumferential direction, and therefore, when the magnetic field of the stator component 40 rotates along the circumferential direction, the rotor component 42 will also rotate along the same direction at the same speed.

In one embodiment, the stator component 40 comprises a coil 406, the rotor component 42 comprises a permanent magnet, the direction of the magnetic flux of the permanent magnet is an axial direction, the magnetic field of the coil 406 and the magnetic field of the permanent magnet interact with each other and generate a torque, to drive a rotor to rotate.

In one embodiment, the stator component 40 and the rotor component 42 is disc-shaped.

In one embodiment, the cup body assembly 2 is detachably connected to the base assembly 1.

In one embodiment, the motor 4 comprises an axial flux motor.

According to an embodiment of the present disclosure, in one embodiment, the rotor component 42 is provided inside the cup body assembly 2, and along the direction of the rotating axis of the rotor component 42, the rotor component 42 is located at one side of the stator component 40.

In the embodiment, the stator component 40 is provided inside the base assembly 1, the rotor component 42 is provided inside the cup body assembly 2, and the rotor component 42 is connected to the cutting tool component 3; due to the interaction between the magnetic field of the stator component 40 and the magnetic field of the rotor component 42, the rotor component 42 can rotate and further bring the cutting tool component 3 to rotate, to achieve the processing to the food materials in the cup body assembly 2. In one embodiment, the rotor component 42 is provided at a side of the stator component 40 in an axial direction, and through a principle of axial magnetic flux coupling, the separation of the rotor component 42 from the stator component 40 is achieved, meanwhile, the thickness of the motor 4 along the axial direction and the weight of the motor 4 can also be reduced, and this further helps reduce the height of the whole food processing machine 100, and is convenient for storing and carrying the food processing machine 100. In addition, as the stator component 40 is disposed separately from the rotor component 42, it is not necessary to dispose a connecting shaft which penetrates the cup body assembly 2 to achieve power transmission, the sealing performance of the cup body assembly 2 is improved, and the noise is lowered during the working of the food processing machine 100.

It is understandable that the motor 4 uses a principle of axial magnetic flux, the rotor component 42 is disposed at the side of the stator component 40 in an axial direction, and a magnetic flux direction is the axial direction; the motor 4 has the characteristics of a compact structure, a small volume and light weight, and therefore, the entire weight and volume of the food processing machine 100 can be lowered.

In one embodiment, the motor 4 comprises the axial flux motor. According to an embodiment of the present disclosure, in one embodiment, along the direction of the rotating axis of the rotor component 42, the gap between the rotor component 42 and the stator component 40 is greater than 0 mm, and is less than or equal to 5 mm.

In the embodiment, if the axial gap between the rotor component 42 and the stator component 40 is too large, the transmission of magnetic chain and torque between them is affected, and the efficiency of the motor 4 is lowered; if the number of inductive turns is increased and magnetic flux is increased to compensate, this will result in an excessively high cost, and therefore, along the direction of the rotating axis of the rotor component 42, the gap between the rotor component 42 and the stator component 40 is disposed to be less than or equal to 5 mm, and this ensures the performances of the motor 4 such as inductance, resistance, starting torque and magnetic flux.

In one embodiment, along the direction of the rotating axis of the rotor component 42, the gap between the rotor component 42 and the stator component 40 is greater than or equal to 0.5 mm, and is less than or equal to 5 mm.

In a specific application, the axial gap between the rotor component 42 and the stator component 40 is disposed to be any of the values of 1 mm, 1.5 mm, 2 mm, 2.5 mm, 3 mm, 3.5 mm, 4 mm, and 4.5 mm.

Figure 5:
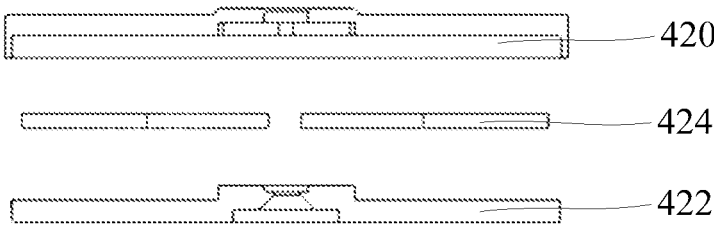
FIG. 5 is a schematic view of the structure of a rotor component according to an embodiment of the present disclosure.

As shown in FIG. 5, according to an embodiment of the present disclosure, in one embodiment, the rotor component 42 comprises: a first magnetic conductive cover 420, fixedly connected to the cutting tool component 3; a second magnetic conductive cover 422, connected to the first magnetic conductive cover 420, and enclosing a mounting cavity together with the first magnetic conductive cover 420; a first magnetic member 424, provided in the mounting cavity, and, the N-pole of the rotor component 42 comprises the N-pole of the first magnetic member 424, and the S-pole of the rotor component 42 comprises the S-pole of the first magnetic member 424.

In the embodiment, the rotor component 42 comprises the first magnetic conductive cover 420, the second magnetic conductive cover 422 and the first magnetic member 424, the first magnetic conductive cover 420 is connected to the second magnetic conductive cover 422, and the mounting cavity is enclosed by the first magnetic conductive cover 420 and the second magnetic conductive cover 422, the first magnetic member 424 is provided in the mounting cavity, and this achieves limiting and mounting the first magnetic member 424; meanwhile, the arrangement of the first magnetic conductive cover 420 and the second magnetic conductive cover 422 also ensures a magnetic flux effect and further ensures the driving performance of the motor 4; the N-pole of the rotor component 42 comprises the N-pole of the first magnetic member 424, the S-pole of the rotor component 42 comprises the S-pole of the first magnetic member 424, the N-pole of the stator component 40 points at the S-pole of the first magnetic member 424 along the direction of the rotating axis of the rotor component 42, the N-pole of the first magnetic member 424 points at the S-pole of the stator component 40 along the direction of the rotating axis of the rotor component 42, and the first magnetic member 424 rotates along the circumferential direction.

In one embodiment, the N-pole of the rotor component 42 is the N-pole of the first magnetic member 424, and the S-pole of the rotor component 42 is the S-pole of the first magnetic member 424. The magnetic force line inside the first magnetic member 424 points at the N-pole of the first magnetic member 424 from the S-pole of the first magnetic member 424 along the circumferential direction of the first magnetic member 424. The N-pole of the stator component 40 points at the S-pole of the first magnetic member 424 along the direction of the rotating axis of the rotor component 42, and the N-pole of the first magnetic member 424 points at the S-pole of the stator component 40 along the direction of the rotating axis of the rotor component 42.

It is understandable that the first magnetic conductive cover 420 and the second magnetic conductive cover 422 are made from magnetic conductive materials.

In one embodiment, the first magnetic member 424 comprises a permanent magnet.

In one embodiment, the first magnetic member 424 can be a piece of ring-shaped or disc-shaped permanent magnet, or can also be ring-shaped or disc-shaped by piecing multiple permanent magnets together.

In one embodiment, through the absorption function between the permanent magnet and the stator iron core 400 of the stator component 40, the positioning of the cup body assembly 2 and the base assembly 1 can also be achieved.

According to an embodiment of the present disclosure, in one embodiment, the first magnetic member 424 disc-shaped or the first magnetic member 424 ring-shaped.

In the embodiment, the first magnetic member 424 can be disc-shaped, and this can improve the magnetic flux and the torque of the motor 4; the first magnetic member 424 can also be ring-shaped, and this can guide and dissipate heat through a hollow portion, to ensure relatively low temperature rise of the motor 4, slowing down the aging rate of the materials of the motor 4, and improving the operation stability and the service life of the motor 4.

Figure 4:
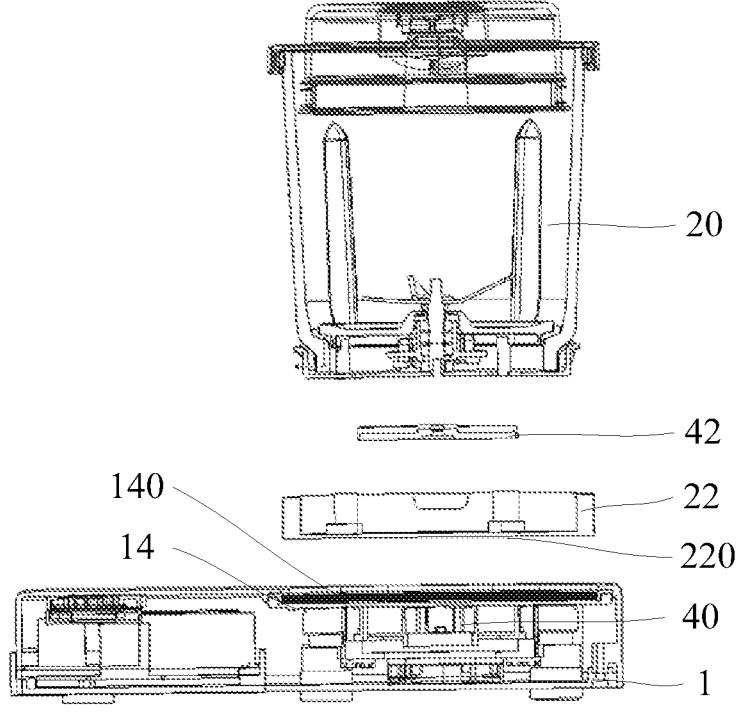
FIG. 4 is a third schematic view of the structure of a food processing machine according to an embodiment of the present disclosure.

As shown in FIG. 4, according to an embodiment of the present disclosure, in one embodiment, the base assembly 1 comprises: a first base body 10, and the stator component 40 is provided in the first base body 10, and arranged opposite to the rotor component 42 from top to bottom; and an isolation cover 14, provided on the top portion of the first base body 10, and the cup body assembly 2 can be placed on the isolation cover 14.

In the embodiment, the base assembly 1 comprises the first base body 10 and the isolation cover 14; the isolation cover 14 is provided on the top portion of the first base body 10, and the cup body assembly 2 can be placed on the isolation cover 14, and furthermore, the rotor component 42 inside the cup body assembly 2 can interact with the stator component 40 provided inside the first base body 10, to achieve driving the cutting tool component 3; meanwhile, the isolation cover 4 achieves the separation between the stator component 40 and the rotor component 42 is achieved, an eddy current phenomenon between them is reduced or eliminated, and the magnetic field coupling performance between the stator component 40 and the rotor component 42 is further enhanced.

It is understandable that the isolation cover 14 can achieve eliminating the eddy current between the stator component 40 and the rotor component 42, to improve the magnetic field coupling performance. Meanwhile, the isolation cover 14 can also enable arranging the stator component 40 and the rotor component 42 at an interval.

According to the embodiment of the present disclosure, in one embodiment, the isolation cover 14 comprises a non-metallic member; and/or along the direction of the rotating axis of the rotor component 42, the thickness of the isolation cover 14 is less than or equal to 5 mm. And/or along the axial direction of the rotor component 42, the surface of the isolation cover 14 facing the cup body assembly 2 is lower than the surface of the first base body 10 facing the cup body assembly 2.

In the embodiment, the isolation cover 14 comprises the non-metallic member, and arranging the non-metallic member between the rotor component 42 and the stator component 40 can decrease or eliminate the eddy current phenomenon between them, and further enhance the magnetic field coupling performance between the stator component 40 and the rotor component 42. In one embodiment, if the thickness of the isolation cover 14 is too large, the transmission of magnetic chain and torque between the stator component 40 and the rotor component 42 will be affected, and the efficiency of the motor 4 will be lowered; and therefore, the thickness of the isolation cover 14 is disposed to be less than or equal to 5 mm, the reliability of the torque transmission between the stator component 40 and the rotor component 42 is ensured while the eddy current is decreased or eliminated.

In one embodiment, the surface where the isolation cover 14 contacts the cup body assembly 2 is a smooth and continuous plane, a curved surface, or a cambered surface, and can be cleaned easily.

In one embodiment, when the cup body assembly 2 is placed on the isolation cover 14, it can be placed in any direction of circumferential 360°, and users do not need to spend time in accurately locating and aligning, and it is very convenient in use.

In one embodiment, the first base body 10 is provided with an opening 12, and the isolation cover 14 is provided at the opening 12. In one embodiment, along the axial direction of the rotor component 42, the surface of the isolation cover 14 facing the cup body assembly 2 is lower than the surface of the first base body 10 facing the cup body assembly 2, and the isolation cover 14 is lower than the first base body 10, and then a groove can be formed at the opening 12, and this helps the cooperation between the cup body assembly 2 and the base assembly 1.

The first base body 10 may not be provided with the opening 12, i.e., the top portion of the first base body 10 is directly a plane. For example, the isolation cover 14 and the first base body 10 can be integrally formed, and the first base body 10 does not need to be provided with the opening 12. Or, the first base body 10 is directly formed to be a plane, and the isolation cover 14 is disposed on the plane.

In one embodiment, the thickness of the isolation cover 14 is greater than or equal to 1 mm, and less than or equal to 3.5 mm.

In one embodiment, the thickness of the isolation cover 14 is equal to any of the values of 1.5 mm, 2 mm, 2.5 mm and 3 mm.

In one embodiment, the isolation cover 114 comprises a high temperature non-metallic member.

As shown in FIG. 1, according to an embodiment of the present disclosure, in one embodiment, the base assembly 1 further comprises: a damping member 16, provided between the stator component 40 and the first base body 10, and on the bottom of the first base body 10.

In the embodiment, the base assembly 1 further comprises the damping member 16, the damping member 16 is provided between the stator component 40 and the first base body 10 and provided on the bottom of the first base body 10, and can reduce the vibration generated during the operation of the stator component 40, and further reduce the noise during the operation of the food processing machine 100.

In one embodiment, the damping member 16 comprises a rubber member or a silica gel member.

As shown in FIG. 1, according to an embodiment of the present disclosure, in one embodiment, the cup body assembly 2 further comprises: a cup body 20; a second base body 22, and the second base body 22 is provided at one end of the cup body 20, and encloses a cavity 24 together with the cup body 20; the cutting tool component 3 is provided in the cavity 24 and divides the cavity 24 into a first cavity 240 and a second cavity 242, a portion of the cutting tool component 3 is provided in the first cavity 240 and the other portion extends into the second cavity 242, and the rotor component 42 is provided in the second cavity 242 and connected to the cutting tool component 3; and a sealing member 26, provided at a connection portion between the cup body 20 and the second base body 22, and used for sealing the second cavity 242.

In the embodiment, the cup body assembly 2 further comprises the cup body 20, the second base body 22 and the sealing member 26. The second base body 22 and the cup body 20 enclose the cavity 24, the cutting tool component 3 is provided in the cavity 24 and divides the cavity 24 into the first cavity 240 and the second cavity 242, the first cavity 240 is configured to hold food materials, a portion of the cutting tool component 3 extends into the first cavity 240, and the other portion is located in the second cavity 242 and connected to the rotor component 42 in the second cavity 242; the rotor component 42 drives the cutting tool component 3 to rotate, and brings the portion of the cutting tool component 3 located in the first cavity 240 to rotate, to achieve processing the food materials in the first cavity 240. In one embodiment, the sealing member 26 is provided at the connection portion between the second base body 22 and the cup body 20, and achieves sealing the second cavity 242, and this further enables washing the entire cup body assembly 2 with water, and thus the convenience of cleaning is improved.

It is understandable that a sealing structure is also provided between the cutting tool component 3 and the cup body 20, and the first cavity 240 is not communicated with the second cavity 242, and this further prevents the food materials or liquid in the first cavity 240 from flowing into the second cavity 242 and thus affecting the operation of the food processing machine 100.

In one embodiment, the sealing member 26 comprises a rubber member or a silica gel member.

Figure 3:
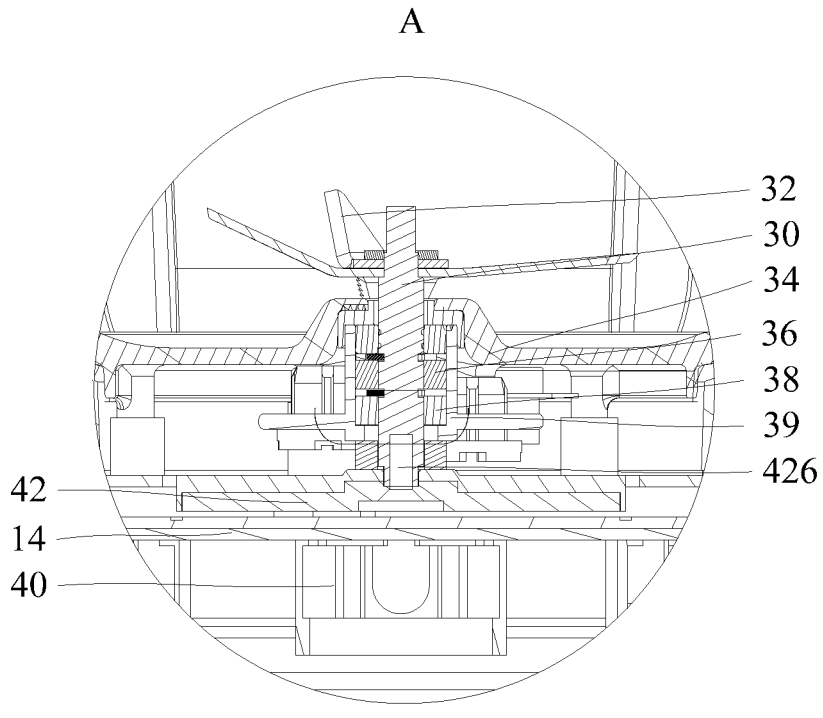
FIG. 3 is an enlarged schematic view of point A of the embodiment as shown in FIG. 2.

As shown in FIG. 1 and FIG. 3, according to an embodiment of the present disclosure, in one embodiment, the cutting tool component 3 comprises: a rotating shaft 30, and a portion of the rotating shaft 30 is located in the first cavity 240, a portion of the rotating shaft 30 is located in the second cavity 242, and the rotor component 42 is fixed to the end portion of the rotating shaft 30 through a connecting member; and a cutting tool 32, provided on the portion of the rotating shaft 30 located in the first cavity 240.

In the embodiment, the cutting tool component 3 comprises the rotating shaft 30 and the cutting tool 32, a portion of the rotating shaft 30 is located in the first cavity 240 and used for mounting the cutting tool 32, a portion of the rotating shaft 30 is located in the second cavity 242 and used for connecting the rotor component 42, and then the processing of food materials by the cutting tool 32 is achieved through the rotating of the rotor component 42.

As shown in FIG. 1 and FIG. 3, according to an embodiment of the present disclosure, in one embodiment, the cutting tool component 3 further comprises: a chassis 34, provided in the cavity 24, and dividing the cavity 24 into the first cavity 240 and the second cavity 242, and the rotating shaft 30 penetrates the chassis 34.

In the embodiment, the cutting tool component 3 further comprises the chassis 34, the chassis 34 is provided in the cavity 24 and divides the cavity 24 into the first cavity 240 and the second cavity 242, to achieve the separation of the food materials from structural members such as the rotor component 42; the rotating shaft 30 penetrates the chassis 34, and further transmits the driving force of the rotor component 42 in the second cavity 242 to the cutting tool 32 in the first cavity 240.

In one embodiment, a sealing structure is provided between the chassis 34 and the cup body 20.

In one embodiment, the chassis 34 comprises a magnetic conductive member (for example, a first magnetic conductive member 5 or a second magnetic conductive member 7).

It is understandable that the sealing structure is provided between the rotating shaft 30 and the chassis 34, to prevent the liquid or food materials in the first cavity 240 from entering the second cavity 242.

As shown in FIG. 4, according to an embodiment of the present disclosure, in one embodiment, the second base body 22 comprises a first mating surface 220, the isolation cover 14 comprises a second mating surface 140, and the first mating surface 220 can be in limiting cooperation with the second mating surface 140.

In the embodiment, the second base body 22 comprises the first mating surface 220, the isolation cover 14 comprises the second mating surface 140, and the first mating surface 220 can be in limiting cooperation with the second mating surface 140, to achieve accurate positioning of the cup body assembly 2 and the base assembly 1, ensuring the relative position of the stator component 40 and the rotor component 42, and further ensuring the interaction of the magnetic fields between the stator component 40 and the rotor component 42.

According to an embodiment of the present disclosure, in one embodiment, the first mating surface 220 comprises any of the following types: a convex surface, a concave surface and a plane; the second mating surface 140 comprises any of the following types: a convex surface, a concave surface and a plane.

In the embodiment, the first mating surface 220 can be a convex surface, a concave surface or a plane, and correspondingly, the second mating surface 140 is a convex surface, a concave surface or a plane which can cooperate with the first mating surface 220.

For example, in the case that the first mating surface 220 is a convex surface, the second mating surface 140 is a concave surface; in the case that the first mating surface 220 is a concave surface, the second mating surface 140 is a convex surface; in the case that the first mating surface 220 is a plane, the second mating surface 140 is a plane.

According to an embodiment of the present disclosure, in one embodiment, a first limiting portion is provided on the first mating surface 220, a second limiting portion is provided on the second mating surface 140, and the first limiting portion is in limiting cooperation with the second limiting portion.

In the embodiment, the first limiting portion is further provided on the first mating surface 220, and the second limiting portion which is in limiting cooperation with the first limiting portion is provided on the second mating surface 140, to further improve the accurate positioning of the cup body assembly 2 and the base assembly 1.

In one embodiment, the first limiting portion and the second limiting portion can be silk screen printed.

Figure 7:
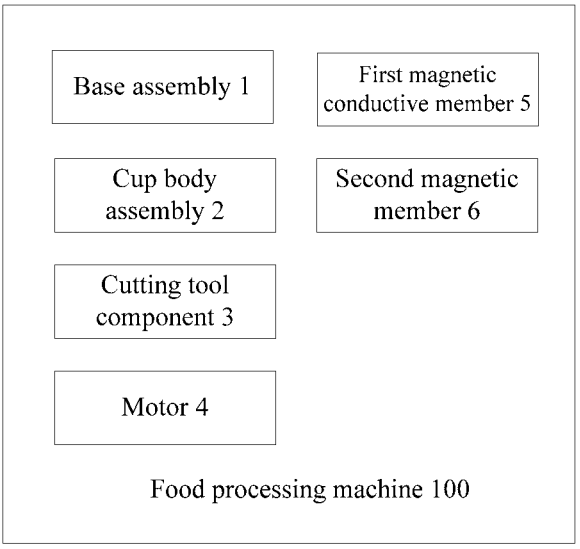
FIG. 7 is a first schematic block diagram of a food processing machine according to an embodiment of the present disclosure.

As shown in FIG. 7, according to an embodiment of the present disclosure, in one embodiment, the food processing machine 100 further comprises: a first magnetic conductive member 5, provided inside the cup body assembly 2; a second magnetic member 6, provided on the rotor component 42 or the cutting tool component 3, and, under the circumstance that the stator component 40 is electrified and generates a magnetic field, the rotor component 42 can bring the second magnetic member 6 to rotate, to make the first magnetic conductive member 5 heat the cup body assembly 2.

In the embodiment, the food processing machine 100 further comprises the first magnetic conductive member 5 and the second magnetic member 6, the first magnetic conductive member 5 is provided in the cup body assembly 2, and the second magnetic member 6 is provided on the rotor component 42 or the cutting tool component 3; due to the interaction between the magnetic field of the stator component 40 and the magnetic field of the rotor component 42, the rotor component 42 is driven to rotate, and the cutting tool component 3 and the second magnetic member 6 are brought to rotate, and the rotation of the cutting tool component 3 can achieve processing the food materials in the cup body assembly 2; the rotation of the second magnetic member 6 can generate a rotating magnetic field, and then the first magnetic conductive member 5 cuts a magnetic induction line and generates heat, to achieve heating the food materials inside the cup body assembly 2.

In one embodiment, the second magnetic member 6 comprise multiple NS magnetic poles, and the multiple NS magnetic poles are arranged at intervals along the circumferential direction of the rotation of the rotor component 42.

In one embodiment, the second magnetic member 6 is an NS rotating magnetic ring disk.

In a specific application, in the case that the second magnetic member 6 is provided on the cutting tool component 3, the second magnetic member 6 is located on the rotating shaft 30 of the cutting tool component 3.

According to an embodiment of the present disclosure, in one embodiment, the second magnetic member 6 is provided on the outer peripheral wall of the rotor component 42, and along the axial direction of the rotor component 42, the distance between the second magnetic member 6 and the stator component 40 is greater than or equal to 2 mm and less than or equal to 3 mm; and/or the first magnetic conductive member 5 is the chassis 34 of the cutting tool component 3.

In the embodiment, along the axial direction of the rotor component 42, the distance between the second magnetic member 6 and the stator component 40 is disposed to be in a range of 2 mm to 3 mm, and this ensures the reliability of the second magnetic member 6 rotating with the rotor component 42; the first magnetic conductive member 5 is the chassis 34 of the cutting tool component 3, and this further improves the heating effect to the food materials inside the first cavity 240 of the cup body assembly 2.

It is understandable that the cutting tool component 3 comprises the chassis 34, the chassis 34 is provided in the cavity 24 of the cup body assembly 2, and divides the cavity 24 into a first cavity 240 and a second cavity 242, and the rotating shaft 30 penetrates the chassis 34.

Figure 8:
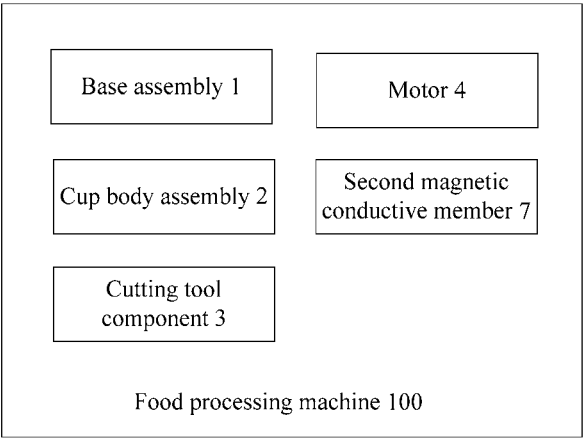
FIG. 8 is a second schematic block diagram of a food processing machine according to an embodiment of the present disclosure.

As shown in FIG. 8, according to an embodiment of the present disclosure, in one embodiment, the food processing machine 100 further comprises: a second magnetic conductive member 7, provided inside the cup body assembly 2; a coil 406 is provided on the base assembly 1, and in the case that the coil 406 is electrified, the second magnetic conductive member 7 can heat the cup body assembly 2.

In the embodiment, the food processing machine 100 further comprises the second magnetic member 6, the second magnetic member 6 is provided inside the cup body assembly 2, and the coil 406 is provided on the base assembly 1; in the case that the coil 406 is electrified, the second magnetic conductive member 7 can be made to cut the magnetic induction line generated by the coil 406, and is further made to generate heat, to achieve heating the cup body assembly 2.

According to an embodiment of the present disclosure, in one embodiment, the stator component 40 comprises the coil 406; and/or the second magnetic conductive member 7 is provided on the outer peripheral wall of the rotor component 42; or the second magnetic conductive member 7 is the chassis 34 of the cutting tool component 3.

In the embodiment, the coil 406 is a portion of the stator component 40, and thus, when the stator component 40 works, it can drive the rotor component 42 to rotate, to achieve driving the cutting tool component 3; when the stator component 40 stops working, the coil 406 of the stator component 40 can be configured to generate a magnetic field, and the second magnetic conductive member 7 cuts the magnetic field generated by the coil 406, to generate an eddy current, and thus achieving heating the food materials inside the cup body assembly 2. In one embodiment, the second magnetic conductive member 7 can be provided on the outer peripheral wall of the rotor component 42, to facilitate the mounting of the second magnetic conductive member 7. In one embodiment, the second magnetic conductive member 7 is the chassis 34 of the cutting tool component 3, and then directly contacts the food materials inside the first cavity 240 of the cup body assembly 2, and this improves the heating effect to the food materials.

Figure 6:
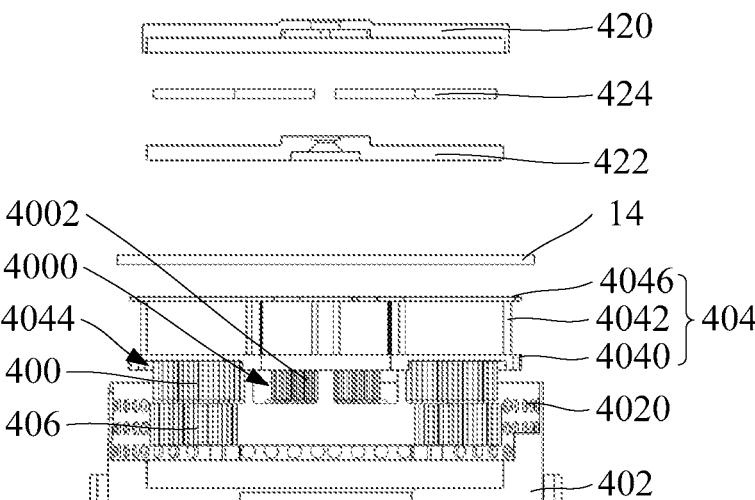
FIG. 6 is a schematic view of the structure of a motor according to an embodiment of the present disclosure.

As shown in FIG. 6, according to an embodiment of the present disclosure, in one embodiment, the stator component 40 comprises a stator iron core 400, the stator iron core 400 comprises multiple layers of laminations, a central through-hole is enclosed by the multiple layers of laminations, and the multiple layers of laminations are in stacked distribution in a radial direction of the central through-hole.

In the embodiment, the stator iron core 400 comprises multiple layers of laminations, the central through-hole is enclosed by the multiple layers of laminations, and the multiple layers of laminations are in stacked distribution in the radial direction of the central through-hole, and thus this can further effectively reduce the magnetic resistance of the stator iron core 400, reduce magnetic loss and improve the efficiency of the motor 4, and the magnetic circuit of the stator iron core 400 is shorter, the motor 4 can be made flatter and thinner, and the miniaturization of the motor 4 can be achieved.

In one embodiment, the multiple layers of laminations are in outward stacked distribution in a radial direction of the central through-hole.

According to an embodiment of the present disclosure, in one embodiment, the multiple layers of laminations are formed by rolling and stacking one lamination along a spiral line from inside to outside.

In the embodiment, in the process of machining and manufacturing the stator iron core 400, the final stator iron core 400 can be obtained by convolving one lamination, and the manufacturing process is simple, to reduce the cost of the stator iron core 400.

In one embodiment, the stator iron core 400 can be a radial rolling structure, the stator iron core 400 is formed by rolling and pressing a strip-shaped lamination in a spiral shape, and the lamination can adopt a strip-shaped iron sheet.

As shown in FIG. 6, according to an embodiment of the present disclosure, in one embodiment, the stator component 40 further comprises: a third base body 402; a support 404, provided within the third base body 402, and the support 404 comprises a base 4040 and a winding portion 4042 provided on the base 4040, an avoidance gap 4044 is provided in the base 4040, and the winding portion 4042 extends along the avoidance gap 4044 towards the direction deviating from the base 4040; the coil 406, winding the winding portion 4042, and the N-pole of the stator component 40 comprises the N-pole of the coil 406, the S-pole of the stator component 40 comprises the S-pole of the coil 406, and at least one end surface of the stator iron core 400 is opened with multiple winding grooves 4000, the winding grooves 4000 penetrate the interior of the stator iron core 400 from the outer surface of the stator iron core 400, the multiple winding grooves 4000 are distributed along the circumferential direction of the stator iron core 400, two adjacent winding grooves 4000 define a stator tooth 4002, the stator tooth 4002 penetrates the base 4040 from the avoidance gap 4044, and the stator tooth 4002 is separated from the coil 406 through the winding portion 4042.

In the embodiment, the stator component 40 further comprises the third base body 402, the support 404 and the coil 406, the N-pole of the stator component 40 comprises the N-pole of the coil 406, and the S-pole of the stator component 40 comprises the S-pole of the coil 406; in the case that the coil 406 is electrified, the N-pole of the coil 406 points at the S-pole of the rotor component 42 along the direction of the rotating axis of the rotor component 42, the N-pole of the rotor component 42 points at the S-pole of the coil 406 along the direction of the rotating axis of the rotor component 42, and the rotor component 42 rotates about the rotating axis. The support 404 is provided within the third base body 402, the support 404 comprises the base 4040 and the winding portion 4042 arranged on the base 4040, the stator tooth 4002 of the stator iron core 400 penetrates the base 4040 from the avoidance gap 4044 in the base 4040, and then the winding portion 4042 sleeves on the stator tooth 4002, and the coil 406 winds around the stator tooth 4002 through the winding portion 4042. In one embodiment, at least one end surface of the stator iron core 400 is provided with multiple winding grooves 4000 for providing a placing position for the winding portion 4042 which cooperates with them; in addition, the winding portion 4042 and the stator iron core 400 are mounted in an embedded manner, and this can effectively lower the volume of the stator component 40 and achieve the minimization of the motor 4.

In one embodiment, the N-pole of the stator component 40 is the N-pole of the coil 406, and the S-pole of the stator component 40 is the S-pole of the coil 406. In the case that the coil 406 is electrified, along the circumferential direction of the coil 406, the magnetic force line inside the coil 406 points at the N-pole of the coil 406 from the S-pole of the coil 406; the N-pole of the coil 406 points at the S-pole of the first magnetic member 424 along the direction of the rotating axis of the rotor component 42, and the N-pole of the first magnetic member 424 points at the S-pole of the coil 406 along the direction of the rotating axis of the rotor component 42.

In one embodiment, when one end surface of the stator iron core 400 is opened with the winding groove 4000, a winding portion 4042 can be provided at one end of the stator iron core 400; when the two ends of the stator iron core 400 are opened with the winding grooves 4000, the winding portions 4042 can be disposed simultaneously at the two ends of the stator iron core 400.

As shown in FIG. 6, according to an embodiment of the present disclosure, in one embodiment, the end of the winding portion 4042 deviating from the base 4040 is provided with a flanging structure 4046, and the winding portion 4042 is located between the flanging structure 4046 and the base 4040.

In the embodiment, the end of the winding portion 4042 deviating from the base 4040 is provided with the flanging structure 4046, the flanging structure 4046, the base 4040 and the winding portion 4042 jointly configure a limiting space, the coil 406 is provided in the limiting space and disposed winding the winding portion 4042, and this can ensure the stable mounting of the coil 406 and prevent the coil 406 from falling off.

As shown in FIG. 6, according to an embodiment of the present disclosure, in one embodiment, the side wall of the third base body 402 is provided with multiple heat dissipation holes 4020.

In the embodiment, the side wall of the third base body 402 is provided with multiple heat dissipation holes 4020, and this can improve the heat dissipation efficiency of the stator component 40 in the third base body 402, further improve the heat dissipation effect of the motor 4, slow down the aging rate of the motor 4, and prolong the service life of the motor 4.

In one embodiment, the heat dissipation holes 4020 are distributed along the circumferential direction of the third base body 402.

According to an embodiment of the present disclosure, in one embodiment, the stator iron core 400 disc-shaped or the stator iron core 400 is ring-shaped.

In the embodiment, the stator iron core 400 is disc-shaped, and this can achieve high magnetic flux and high torque, and further improve the driving effect to the cutting tool component 3. The stator iron core 400 can also be ring-shaped, the hollow portion can increase the heat dissipation effect, and this slows down the aging rate of the motor 4.

It needs to be explained that the food processing machine comprises a wall-breaking machine, a soybean milk machine, an auxiliary food machine, etc.

In a specific application, the food processing machine 100 (an upper rotor whipping cup) is composed of the cup body 20, the cutting tool component 3, a cup body sealing cover (for example, the second base body 22), the motor 4 and a driving control base (for example, base assembly 1); the chassis 34 (a heating plate) is fixed to a blade fixing shaft (for example, the rotating shaft 30) through two sliding bearings 36 and an end surface bearing 38, after being positioned with a snap spring, the composed bearing assembly is fixed through a shaft and a bearing blade and is connected and locked with a support plate 39 with screws, the rotor component 42 is fixed to the rotating shaft 30 through a screw 426, a blade and a fixing nut are locked to the blade fixing shaft, and then a cup bottom sealing cover is sealed to a whipping cup body (for example, the cup body 20).

For the base assembly 1 and a touch control assembly of the food processing machine 100, a motor bottom shell upper cover (for example, the isolation cover 14) is fixed on an upper cover of a base 4040 (for example, the first base body 10), and then the stator component 40 is placed therein, after a copper wire (for example, the coil 406) is wound around a motor stator support (for example, the support 404), it is sleeved into the stator iron core 400; after a motor assembly is made, the motor assembly is locked on four screw columns on the upper cover of the base 4040 through screws, and then a damping silica gel pad is placed at the bottom cover of the base 4040 and the damping silica gel foot of the base 4040 and is fixed.

In one embodiment, the rotor component 42 is between the blade fixing shaft and the second base body 22, and the stator component 40 is inside the motor fixing housing of the base assembly 1.

Through the principle of axial magnetic field coupling, the present disclosure achieves the separation of the stator/rotor and the fixed connection between the rotor component 42 and the blade fixing shaft, conducts positioning by stator/rotor outer ring magnetic attraction plus structural planar silk screen printing, achieves accurate alignment and positioning, and achieves crushing and stirring food materials.

In one embodiment, the motor is a split structure, the rotor component 42 is disposed inside the cup body 20, the stator component 40 is placed inside the base assembly 1, and this can achieve a completely new form of wall breaking machine (there is no coupling between the cup body 20 and the base assembly 1), and the cup body 20 (the rotor in the motor) is separated from the stator inside the base assembly 1.

In one embodiment, the upper cover of the base can be a convex plane or a concave plane, an arc-shaped surface, or a horizontal plane; a cup bottom base cover (for example, the second base body 22) can be a convex plane or a concave plane, an arc-shaped surface, or a horizontal plane.

In one embodiment, the rotor component 42 is connected and fixed with the blade fixing shaft through fixing the screw 426, and a rotor blade component assembly (for example, the cutting tool component 3) is composed of a heating plate (for example, the chassis 34), a blade (for example, the cutting tool 32), a rotating bearing, the end surface bearing 38 and a chassis fixing support 404.

In one embodiment, the separation of the stator component 40 from the rotor component 42 is achieved by adopting the principle of axial magnetic flux magnetic coupling; in one embodiment, the rotor component 42 and the stator component 40 present a hollow annular structure, a hollow cylinder provides flow guide and heat dissipation, to ensure a low temperature rise of the motor, slowing down the aging of the materials of the motor 4 and improving the operation stability and the service life of the motor 4; another type can be that the rotor component 42 presents a disc structure, the stator component 40 is hollow, and this can enhance the magnetic flux and the magnetic chain, and the starting rotational torque of the motor 4, and improve the crushing and stirring performance of the food processing machine 100; and a third type is that both the rotor component 42 and the stator component 40 are full disc structures, and this achieves high magnetic flux and high torque.

In one embodiment, the positioning of the cup body component and the base component can adopt a method for polygon/three-point positioning, or positioning slot positioning (removing a coupling coupler).

In one embodiment, by adopting axial magnetic flux magnetic coupling plus magnetic attraction positioning, self-adaptive positioning and alignment of the rotor component 42 and the stator component 40 are achieved.

In one embodiment, the cup body 20 and the second base body 22 are a full sealing cup body structure, and this realizes washing the entirety of the cup body 20 with water and a dishwasher.

In one embodiment, the material of a stator base (for example, the third base body 402) and a stator wire frame (for example, the support 404) adopts polyphenylene sulfide (PPS), the stator iron core 400 adopts a silicon steel sheet, a rotor retaining sleeve (for example, the first magnetic conductive cover 420 and the second magnetic conductive cover 422) adopts aluminum, a high performance permanent magnet (for example, the first magnetic member 424) adopts neodymium iron boron; the stator iron core 400 comprises multiple layers of laminations, a central through-hole is enclosed by the multiple layers of laminations, and the multiple layers of laminations are in an outward stacked distribution in a radial direction of the central through-hole. The stator iron core 400 provided by the present disclosure comprises multiple layers of laminations, and the multiple layers of laminations are in stacked distribution in the radial direction of the stator iron core 400, and this can further effectively reduce the magnetic resistance of the stator iron core 400, reduce the magnetic loss and further improve the efficiency of the motor 4; therefore, the magnetic circuit of the stator iron core 400 is shorter, the motor 4 can be made flatter and thinner, and thus the miniaturization of the motor can be achieved. In one embodiment, the lamination can adopt the strip iron sheet.

In one embodiment, the gap between the rotor component 42 and the stator component 40 is kept between 0.5 mm and 5 mm ($\leq$5 mm), otherwise, the parameters of the motor 4 such as the inductance, resistance, starting torque and magnetic chain are affected; if the gap between the rotor component 42 and the stator component 40 is $\geq$5 mm, the magnetic chain and the torque will be reduced, the efficiency of the motor 4 is reduced, and if the number of inductive turns and magnetic flux are increased to compensate, this will result in a relatively high cost.

In one embodiment, the stator component 40 and rotor component 42 are separated by a high-temperature non-metallic material (for example, the isolation cover 14), the thickness is limited between 1 mm and 3.5 mm ($\leq$5 mm), and this basically eliminates axial eddy currents and improves magnetic field coupling performance.

The food processing machine 100 provided by the present disclosure eliminates the two main noise sources of the coupling and the fan of the motor 4 among three major noise sources, the problems of difficult alignment and difficult positioning are solved, and the effect of being light and thin and being easy to store is achieved.

In one embodiment, the present disclosure adopts an elastic damping, and reduces and alleviates the vibration and noise generated during stirring and crushing.

In one embodiment, when the motor 4 stops working, a magnetic field and an eddy current can be generated by limiting an original loop and adding an outer ring metal plate (for example, the second magnetic conductive member 7) on the rotor component 42, and electromagnetic heating (induction heat, IH) is achieved, and this solution does not need to increase a control loop and achieve slow cost and small volume heating. In one embodiment, in a manner of single tube control, the distance between the metal rings outside the stator component 40 and the rotor component 42 is limited to be 11.5 mm±0.5 mm; in one embodiment, an NS rotating magnetic ring disk can also be provided outside the rotor component 42, and the motor 4 drives the rotor component 42 and the NS rotating magnetic ring disk to rotate, and thus a rotating magnetic field is generated and heating is achieved. The distance between the stator component 40 and the NS rotating magnetic ring disk is limited to be 3.5 mm±1.5 mm.

An embodiment according to the present disclosure also provides a motor 4, comprising: a stator component 40; a rotor component 42, and the stator component 40 can drive the rotor component 42 to rotate, and a magnetic force line between the stator component 40 and the rotor component 42, along the direction of a rotating axis of the rotor component 42, points at an S-pole of the rotor component 42 from an N-pole of the stator component 40 and points at an S-pole of the stator component 40 from an N-pole of the rotor component 42; a magnetic force line inside the stator component 40 points at the N-pole of the stator component 40 from the S-pole of the stator component 40 along a circumferential direction of the stator component 40, and a magnetic force line inside the rotor component 42 points at the N-pole of the rotor component 42 from the S-pole of the rotor component 42 along a circumferential direction of the rotor component 42.

According to the motor 4 provided by the present disclosure, the magnetic force line inside the stator component 40 points at the N-pole of the stator component 40 from the S-pole of the stator component 40 along the circumferential direction of the stator component 40, and the magnetic field of the stator component 40 rotates along the circumferential direction, the N-pole of the stator component 40 generates a repulsive force to the N-pole of the rotor component 42, the S-pole of the stator component 40 generates an attractive force to the N-pole of the rotor component 42, the S-pole of the stator component 40 generates a repulsive force to the N-pole of the rotor component 42, the N-pole of the stator component 40 generates an attractive force to the S-pole of the rotor component 42, the electromagnetic forces to the N-pole and the S-pole of the rotor component 42 along the axial direction of the rotor component 42 counteract each other, the direction of a resultant force is the electromagnetic force along the circumferential direction, and therefore, when the magnetic field of the stator component 40 rotates along the circumferential direction, the rotor component 42 will also rotate along the same direction, and furthermore, under the effect of the stator component 40, the rotating of the rotor component 42 is achieved; through the rotating of the rotor component 42, the output of the driving force is achieved; in addition, through the distribution of the magnetic fields of the stator component 40 and the rotor component 42, an axial magnetic flux of the motor 4 is achieved, and then, the stator component 40 and the rotor component 42 can be arranged separately along an axial direction; when storing, users can separately store a portion with the stator component 40 and a portion with the rotor component 42, and then the convenience for storage and carriage is improved.

It is understandable that the stator component 40 comprises the coil 406, and the magnetic field generated when the coil 406 is electrified with a three-phase alternating current rotates in the circumferential direction.

In one embodiment, when the magnetic field of the stator component 40 rotates along the circumferential direction, the rotor component 42 will also rotate along the same direction at the same speed.

It is understandable that the stator component 40 comprises multiple N-poles (for example, N-pole ① and N-pole ②)) and multiple S-poles, In one embodiment, as shown in FIG. 9 and FIG. 10, the N-pole ① of the stator component 40 generates an attractive force to the N-pole of the rotor component 42, the S-pole of the stator component 40 generates an attractive force and a repulsive force respectively to the N-pole and the S-pole of the rotor component 42; the N-pole ② of the stator component 40 generates an attractive force to the S-pole of the rotor component 42, the electromagnetic forces to the N-pole and the S-pole of the rotor component 42 along the axial direction counteract each other, a resultant force is only the electromagnetic force along the circumferential direction, and therefore, when the magnetic field of the stator component 40 rotates along the circumferential direction, the rotor component 42 will also rotate along the same direction at the same speed.

In some possible designs, along the direction of the rotating axis of the rotor component 42, the rotor component 42 is located at one side of the stator component 40.

In the design, the rotor component 42 is provided at a side of the stator component 40 in an axial direction, and through a principle of axial magnetic flux coupling, the separation of the rotor component 42 from the stator component 40 is achieved, meanwhile, the thickness of the motor 4 along the axial direction and the weight of the motor 4 can also be reduced, and this further helps reduce the height of the whole food processing machine 100, and is convenient for storing and carrying the motor 4. In addition, as the stator component 40 is disposed separately from the rotor component 42, it is not necessary to dispose a connecting shaft which penetrates the cup body assembly 2 to achieve power transmission, the sealing performance of the cup body assembly 2 is improved, and the noise is lowered during the working of the food processing machine 100.

It is understandable that the motor 4 uses a principle of axial magnetic flux, the rotor component 42 is disposed at the side of the stator component 40 in an axial direction, and a magnetic flux direction is the axial direction; the motor 4 has the characteristics of a compact structure, a small volume and light weight, and therefore, the entire weight and volume of the food processing machine 100 can be lowered.

In one embodiment, the motor 4 comprises an axial flux motor.

In some possible designs, along the direction of the rotating axis of the rotor component 42, the gap between the rotor component 42 and the stator component 40 is greater than 0 mm, and is less than or equal to 5 mm.

In the design, if the axial gap between the rotor component 42 and the stator component 40 is too large, the transmission of magnetic chain and torque between them is affected, and the efficiency of the motor 4 is lowered; if the number of inductive turns is increased and magnetic flux is increased to compensate, this will result in an excessively high cost, and therefore, along the direction of the rotating axis of the rotor component 42, the gap between the rotor component 42 and the stator component 40 is disposed to be less than or equal to 5 mm, and this ensures the performances of the motor 4 such as inductance, resistance, starting torque and magnetic flux.

In one embodiment, along the direction of the rotating axis of the rotor component 42, the gap between the rotor component 42 and the stator component 40 is greater than or equal to 0.5 mm, and is less than or equal to 5 mm.

In a specific application, the axial gap between the rotor component 42 and the stator component 40 is disposed to be any of the values of 1 mm, 1.5 mm, 2 mm, 2.5 mm, 3 mm, 3.5 mm, 4 mm, and 4.5 mm.

As shown in FIG. 5, in some possible designs, the rotor component 42 comprises: a first magnetic conductive cover 420; a second magnetic conductive cover 422, connected to the first magnetic conductive cover 420 and enclosing a mounting cavity together with the first magnetic conductive cover 420; a first magnetic member 424, provided in the mounting cavity, and, the N-pole of the rotor component 42 comprises the N-pole of the first magnetic member 424, and the S-pole of the rotor component 42 comprises the S-pole of the first magnetic member 424.

In the design, the rotor component 42 comprises the first magnetic conductive cover 420, the second magnetic conductive cover 422 and the first magnetic member 424, the first magnetic conductive cover 420 is connected to the second magnetic conductive cover 422, and the mounting cavity is enclosed by the first magnetic conductive cover 420 and the second magnetic conductive cover 422, the first magnetic member 424 is provided in the mounting cavity, and this achieves limiting and mounting the first magnetic member 424; meanwhile, the arrangement of the first magnetic conductive cover 420 and the second magnetic conductive cover 422 also ensures a magnetic flux effect and further ensures the driving performance of the motor 4; the N-pole of the rotor component 42 comprises the N-pole of the first magnetic member 424, the S-pole of the rotor component 42 comprises the S-pole of the first magnetic member 424, the N-pole of the stator component 40 points at the S-pole of the first magnetic member 424 along the direction of the rotating axis of the rotor component 42, the N-pole of the first magnetic member 424 points at the S-pole of the stator component 40 along the direction of the rotating axis of the rotor component 42, and the first magnetic member 424 rotates along the circumferential direction.

In one embodiment, the N-pole of the rotor component 42 is the N-pole of the first magnetic member 424, and the S-pole of the rotor component 42 is the S-pole of the first magnetic member 424. The magnetic force line inside the first magnetic member 424 points at the N-pole of the first magnetic member 424 from the S-pole of the first magnetic member 424 along the circumferential direction of the first magnetic member 424. The N-pole of the stator component 40 points at the S-pole of the first magnetic member 424 along the direction of the rotating axis of the rotor component 42, and the N-pole of the first magnetic member 424 points at the S-pole of the stator component 40 along the direction of the rotating axis of the rotor component 42.

It is understandable that the first magnetic conductive cover 420 and the second magnetic conductive cover 422 are made from magnetic conductive materials.

In one embodiment, the first magnetic member 424 comprises a permanent magnet.

In one embodiment, the first magnetic member 424 can be a piece of ring-shaped or disc-shaped permanent magnet, or can also be ring-shaped or disc-shaped by piecing multiple permanent magnets together.

In some possible designs, the first magnetic member 424 is disc-shaped or the first magnetic member 424 ring-shaped.

In the design, the first magnetic member 424 can be disc-shaped, and this can improve the magnetic flux and the torque of the motor 4; the first magnetic member 424 can also be ring-shaped, and this can guide and dissipate heat through a hollow portion, to ensure relatively low temperature rise of the motor 4, slowing down the aging rate of the materials of the motor 4, and improving the operation stability and the service life of the motor 4.

As shown in FIG. 6, in some possible designs, the stator component 40 comprises a stator iron core 400, the stator iron core 400 comprises multiple layers of laminations, a central through-hole is enclosed by the multiple layers of laminations, and the multiple layers of laminations are in stacked distribution in a radial direction of the central through-hole.

In the design, the stator iron core 400 comprises multiple layers of laminations, the central through-hole is enclosed by the multiple layers of laminations, and the multiple layers of laminations are in stacked distribution in the radial direction of the central through-hole, and thus this can further effectively reduce the magnetic resistance of the stator iron core 400, reduce magnetic loss and improve the efficiency of the motor 4, and the magnetic circuit of the stator iron core 400 is shorter, the motor 4 can be made flatter and thinner, and the miniaturization of the motor 4 can be achieved.

In one embodiment, the multiple layers of laminations are in outward stacked distribution in a radial direction of the central through-hole.

In some possible designs, the multiple layers of laminations are formed by rolling and stacking one lamination along a spiral line from inside to outside.

In the design, in the process of machining and manufacturing the stator iron core 400, the final stator iron core 400 can be obtained by convolving one lamination, and the manufacturing process is simple, to reduce the cost of the stator iron core 400.

In one embodiment, the stator iron core 400 can be a radial rolling structure, the stator iron core 400 is formed by rolling and pressing a strip-shaped lamination in a spiral shape, and the lamination can adopt a strip-shaped iron sheet.

As shown in FIG. 6, in some possible designs, the stator component 40 further comprises: a third base body 402; a support 404, provided within the third base body 402, and the support 404 comprises a base 4040 and a winding portion 4042 provided on the base 4040, an avoidance gap 4044 is provided in the base 4040, and the winding portion 4042 extends along the avoidance gap 4044 towards the direction deviating from the base 4040; the coil 406, winding the winding portion 4042, and the N-pole of the stator component 40 comprises the N-pole of the coil 406, the S-pole of the stator component 40 comprises the S-pole of the coil 406, and at least one end surface of the stator iron core 400 is opened with multiple winding grooves 4000, the winding grooves 4000 penetrate the interior of the stator iron core 400 from the outer surface of the stator iron core 400, the multiple winding grooves 4000 are distributed along the circumferential direction of the stator iron core 400, two adjacent winding grooves 4000 define a stator tooth 4002, the stator tooth 4002 penetrates the base 4040 from the avoidance gap 4044, and the stator tooth 4002 is separated from the coil 406 through the winding portion 4042.

In the design, the stator component 40 further comprises the third base body 402, the support 404 and the coil 406, the N-pole of the stator component 40 comprises the N-pole of the coil 406, and the S-pole of the stator component 40 comprises the S-pole of the coil 406; in the case that the coil 406 is electrified, the N-pole of the coil 406 points at the S-pole of the rotor component 42 along the direction of the rotating axis of the rotor component 42, the N-pole of the rotor component 42 points at the S-pole of the coil 406 along the direction of the rotating axis of the rotor component 42, and the rotor component 42 rotates about the rotating axis. The support 404 is provided within the third base body 402, the support 404 comprises the base 4040 and the winding portion 4042 arranged on the base 4040, the stator tooth 4002 of the stator iron core 400 penetrates the base 4040 from the avoidance gap 4044 in the base 4040, and then the winding portion 4042 sleeves on the stator tooth 4002, and the coil 406 winds around the stator tooth 4002 through the winding portion 4042. In one embodiment, at least one end surface of the stator iron core 400 is provided with multiple winding grooves 4000 for providing a placing position for the winding portion 4042 which cooperates with them; in addition, the winding portion 4042 and the stator iron core 400 are mounted in an embedded manner, and this can effectively lower the volume of the stator component 40 and achieve the minimization of the motor 4.

In one embodiment, the N-pole of the stator component 40 is the N-pole of the coil 406, and the S-pole of the stator component 40 is the S-pole of the coil 406. In the case that the coil 406 is electrified, along the circumferential direction of the coil 406, the magnetic force line inside the coil 406 points at the N-pole of the coil 406 from the S-pole of the coil 406; the N-pole of the coil 406 points at the S-pole of the first magnetic member 424 along the direction of the rotating axis of the rotor component 42, and the N-pole of the first magnetic member 424 points at the S-pole of the coil 406 along the direction of the rotating axis of the rotor component 42.

In one embodiment, when one end surface of the stator iron core 400 is opened with the winding groove 4000, a winding portion 4042 can be provided at one end of the stator iron core 400; when the two ends of the stator iron core 400 are opened with the winding grooves 4000, the winding portions 4042 can be disposed simultaneously at the two ends of the stator iron core 400.

As shown in FIG. 6, in some possible designs, the end of the winding portion 4042 deviating from the base 4040 is provided with a flanging structure 4046, and the winding portion 4042 is located between the flanging structure 4046 and the base 4040.

In the design, the end of the winding portion 4042 deviating from the base 4040 is provided with the flanging structure 4046, the flanging structure 4046, the base 4040 and the winding portion 4042 jointly configure a limiting space, the coil 406 is provided in the limiting space and disposed winding the winding portion 4042, and this can ensure the stable mounting of the coil 406 and prevent the coil 406 from falling off.

As shown in FIG. 6, in some possible designs, the side wall of the third base body 402 is provided with multiple heat dissipation holes 4020.

In the design, the side wall of the third base body 402 is provided with multiple heat dissipation holes 4020, and this can improve the heat dissipation efficiency of the stator component 40 in the third base body 402, further improve the heat dissipation effect of the motor 4, slow down the aging rate of the motor 4, and prolong the service life of the motor 4.

In one embodiment, the heat dissipation holes 4020 are distributed along the circumferential direction of the third base body 402.

In some possible designs, the stator iron core 400 is disc-shaped or the stator iron core 400 ring-shaped.

In the design, the stator iron core 400 is disc-shaped, and this can achieve high magnetic flux and high torque, and further improve the driving effect to the cutting tool component 3. The stator iron core 400 can also be ring-shaped, the hollow portion can increase the heat dissipation effect, and this slows down the aging rate of the motor 4.

In the present disclosure, the term of "multiple" indicates two or more than two, unless otherwise explicitly specified or defined. The phrases of "mounting", "connected with", "connected to", "fixing" and the like should be understood in a broad sense, for example, the phrase "connected to" may be a fixed connection, and may also be a removable connection, or an integral connection; and the phrase "connected with" may be a direct connection and may also be an indirect connection through an intermediate medium. Understand the specific meanings of the phrases in the present disclosure according to specific situations.

In the description of the present specification, the descriptions of the phrases "one embodiment", "some embodiments" and "specific embodiments" and the like mean that the specific features, structures, materials or characteristics described in combination with the embodiment(s) or example(s) are included in at least one embodiment or example of the present disclosure. In the specification, the schematic representation of the above phrases does not necessarily refer to the same embodiment or example. Moreover, the particular features, structures, materials or characteristics described may be combined in a suitable manner in any one or more of the embodiments or examples.

The descriptions above are only some embodiments of the present disclosure, and are not configured to limit the present disclosure. The present disclosure may have various changes and variations. Any modifications, equivalent substitutions, improvements, etc. made within the spirit and principle of the present disclosure shall all be included in the protection scope of the present disclosure.

What is claimed is:

1. A food processing machine, comprising:
   a base assembly;
   a cup body assembly, capable of being mounted on the base assembly, wherein the cup body assembly comprises a cutting tool component;
   a motor, wherein the motor comprises a stator component and a rotor component, the stator component is provided in the base assembly, the rotor component brings the cutting tool component to rotate, and the stator component is able to drive the rotor component to rotate, wherein, a magnetic force line between the stator component and the rotor component, along the direction of a rotating axis of the rotor component, points at an S-pole of the rotor component from an N-pole of the stator component and points at an S-pole of the stator component from an N-pole of the rotor component; and a magnetic force line inside the stator component points at the N-pole of the stator component from the S-pole of the stator component along a circumferential direction of the stator component, and a magnetic force line inside the rotor component points at the N-pole of the rotor component from the S-pole of the rotor component along a circumferential direction of the rotor component; and a first magnetic conductive member, provided within the cup body assembly; a second magnetic member, provided on the rotor component or the cutting tool component, wherein, under the circumstance that the stator component is electrified and generates a magnetic field, the rotor component is able to bring the second magnetic member to rotate, to make the first magnetic conductive member heat the cup body assembly.

2. The food processing machine according to claim 1, wherein, the rotor component is provided inside the cup body assembly, and along the direction of the rotating axis of the rotor component, the rotor component is located at one side of the stator component, wherein, along the direction of the rotating axis of the rotor component, the gap between the rotor component and the stator component is greater than 0 mm, and is less than or equal to 5 mm.

3. The food processing machine according to claim 1, wherein, the rotor component comprises:

a first magnetic conductive cover, fixedly connected to the cutting tool component;

a second magnetic conductive cover, connected to the first magnetic conductive cover, and enclosing a mounting cavity together with the first magnetic conductive cover;

a first magnetic member, provided in the mounting cavity, wherein, the N-pole of the rotor component comprises the N-pole of the first magnetic member, and the S-pole of the rotor component comprises the S-pole of the first magnetic member, wherein, the first magnetic member is disc-shaped or ring-shaped.

4. The food processing machine according to claim 1, wherein, the base assembly comprises:

a first base body, wherein the stator component is provided in the first base body, and arranged opposite to the rotor component from top to bottom; and an isolation cover, provided on the top portion of the first base body, wherein the cup body assembly is able to be placed on the isolation cover, wherein, the isolation cover comprises a non-metallic member; and along the direction of the rotating axis of the rotor component, the thickness of the isolation cover is less than or equal to 5 mm, wherein, the base assembly further comprises:

a damping member, provided between the stator component and the first base body, and on the bottom of the first base body, wherein the cup body assembly further comprises:

a cup body;

a second base body, wherein the second base body is provided at one end of the cup body, and encloses a cavity together with the cup body;

the cutting tool component is provided in the cavity and divides the cavity into a first cavity and a second cavity, a portion of the cutting tool component is provided in the first cavity and the other portion extends into the second cavity, and the rotor component is provided in the second cavity and connected to the cutting tool component; and a sealing member, provided at a connection portion between the cup body and the second base body, and used for sealing the second cavity.

5. The food processing machine according to claim 4, wherein, the cutting tool component comprises:

a rotating shaft, wherein a portion of the rotating shaft is located in the first cavity, a portion of the rotating shaft is located in the second cavity, and the rotor component is fixed to the end portion of the rotating shaft through a connecting member; and a cutting tool, provided on the portion of the rotating shaft located in the first cavity, wherein, the cutting tool component further comprises:

a chassis, provided in the cavity, and dividing the cavity into the first cavity and the second cavity, wherein the rotating shaft penetrates the chassis.

6. The food processing machine according to claim 4, wherein, the second base body comprises a first mating surface, the isolation cover comprises a second mating surface, and the first mating surface is able to cooperate with the second mating surface.

7. The food processing machine according to claim 1, wherein, the second magnetic member is provided on the outer peripheral wall of the rotor component, and along the axial direction of the rotor component, the distance between the second magnetic member and the stator component is greater than or equal to 2 mm and less than or equal to 3 mm; and/or the first magnetic conductive member is the chassis of the cutting tool component.

8. The food processing machine according to claim 1, further comprising:

a second magnetic conductive member, provided in the cup body assembly;

a coil is provided on the base assembly, and in the case that the coil is electrified, the second magnetic conductive member is able to heat the cup body assembly.

9. The food processing machine according to claim 8, wherein, the stator component comprises the coil; and/or the second magnetic conductive member is provided on the outer peripheral wall of the rotor component; or the second magnetic conductive member is the chassis of the cutting tool component.

10. The food processing machine according to claim 1, wherein, the stator component comprises:

a stator iron core, wherein the stator iron core comprises multiple layers of laminations, a central through-hole is enclosed by the multiple layers of laminations, and the multiple layers of laminations are in stacked distribution in a radial direction of the central through-hole.

11. The food processing machine according to claim 10, wherein, the multiple layers of laminations are formed by rolling and stacking one lamination along a spiral line from inside to outside.

12. The food processing machine according to claim 10, wherein, the stator component further comprises:

a third base body;

a support, provided within the third base body, wherein the support comprises a base and a winding portion provided on the base, an avoidance gap is provided in the base, and the winding portion extends along the avoidance gap towards a direction deviating from the base;

a coil, wound on the winding portion, wherein the N-pole of the stator component comprises the N-pole of the coil, the S-pole of the stator component comprises the S-pole of the coil, wherein at least one end surface of the stator iron core is opened with multiple winding grooves, the winding grooves penetrate the interior of the stator iron core from the outer surface of the stator iron core, the multiple winding grooves are distributed along the circumferential direction of the stator iron core, two adjacent winding grooves define a stator tooth, the stator tooth penetrates the base from the avoidance gap, and the stator tooth is separated from the coil through the winding portion, wherein, the end of the winding portion deviating from the base is provided with a flanging structure, and the winding portion is located between the flanging structure and the base, wherein, the side wall of the third base body is provided with multiple heat dissipation holes.

13. The food processing machine according to claim 10, wherein, the stator iron core is disc-shaped or ring-shaped.

* * * * *